(12) United States Patent
Sato et al.

(10) Patent No.: US 8,163,246 B2
(45) Date of Patent: Apr. 24, 2012

(54) SPOUTED-FLUIDIZED BED-TYPE OLEFIN POLYMERIZATION REACTOR

(75) Inventors: Hideki Sato, Ichihara (JP); Hiroyuki Ogawa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 43 days.

(21) Appl. No.: 12/795,432

(22) Filed: Jun. 7, 2010

(65) Prior Publication Data

US 2010/0311923 A1 Dec. 9, 2010

(30) Foreign Application Priority Data

Jun. 8, 2009 (JP) .............................. P2009-137388

(51) Int. Cl.
- *C08F 2/01* (2006.01)
- *B01J 8/08* (2006.01)
- *B01J 19/00* (2006.01)
- *B01J 19/18* (2006.01)

(52) U.S. Cl. ........... 422/131; 422/134; 422/132; 526/65
(58) Field of Classification Search ................... 526/65; 422/131, 134, 132
See application file for complete search history.

(56) References Cited

U.S. PATENT DOCUMENTS

| | | | |
|---|---|---|---|
| 2,477,454 A | 7/1949 | Heath | |
| 2,867,506 A | 1/1959 | Roberts | |
| 2,890,106 A | 6/1959 | Heath | |
| 2,936,303 A | 5/1960 | Goins | |
| 3,079,222 A | 2/1963 | Reeve | |
| 3,242,586 A | 3/1966 | Peterson | |
| 3,262,922 A | 7/1966 | Payne | |
| 3,495,952 A | 2/1970 | Ulbrecht | |
| 3,644,583 A | 2/1972 | Scoggin | |
| 3,652,527 A | 3/1972 | Trieschmann et al. | |
| 3,719,029 A | 3/1973 | Suzukawa et al. | |
| 3,770,714 A | 11/1973 | Dorschner et al. | |
| 3,776,979 A | 12/1973 | Hill | |
| 3,922,322 A | 11/1975 | Roger et al. | |
| 3,957,448 A | 5/1976 | Shepard et al. | |
| 3,971,768 A | 7/1976 | Peters et al. | |
| 4,129,701 A | 12/1978 | Jezl et al. | |
| 4,337,722 A | 7/1982 | Debayeux et al. | |

(Continued)

FOREIGN PATENT DOCUMENTS

CA  739660 A  8/1966

(Continued)

OTHER PUBLICATIONS

Notice of Allowance dated Oct. 20, 2011 for U.S. Appl. No. 13/116,479.

(Continued)

*Primary Examiner* — William Cheung
(74) *Attorney, Agent, or Firm* — Birch, Stewart, Kolasch & Birch, LLP

(57) ABSTRACT

An olefin polymerization reactor according to the present invention comprises: a vertically extending cylinder; a decreasing diameter portion on the cylinder, having an inside diameter that decreases progressively downward, and having a gas inlet orifice at a bottom end thereof; and a plurality of through holes passing through from an outside surface towards an inside surface of the decreasing diameter portion. Inside a reaction zone enclosed by an inside surface of the decreasing diameter portion and an inside surface above the decreasing diameter portion of the cylinder, a spouted-fluidized bed or a spouted bed is formed.

23 Claims, 14 Drawing Sheets

U.S. PATENT DOCUMENTS

| | | | |
|---|---|---|---|
| 4,373,272 | A | 2/1983 | Jones et al. |
| 4,404,083 | A | 9/1983 | Vasalos |
| 4,419,330 | A | 12/1983 | Ishihara et al. |
| 4,441,822 | A | 4/1984 | Biswas et al. |
| 4,457,896 | A | 7/1984 | Kono |
| 4,466,082 | A | 8/1984 | Zoschak et al. |
| 4,518,750 | A | 5/1985 | Govoni et al. |
| 4,533,367 | A * | 8/1985 | Hadzismajlovic ............ 95/211 |
| 4,578,183 | A | 3/1986 | Chou et al. |
| 4,640,339 | A | 2/1987 | Klaren |
| 4,744,413 | A | 5/1988 | Klaren et al. |
| 5,034,195 | A | 7/1991 | Platz |
| 5,084,540 | A | 1/1992 | Albizzati et al. |
| 5,213,768 | A | 5/1993 | Maurel et al. |
| 5,235,009 | A | 8/1993 | Hogan |
| 5,244,990 | A | 9/1993 | Mitchell |
| 5,245,093 | A | 9/1993 | Ember |
| 5,536,378 | A | 7/1996 | Gibson et al. |
| 5,674,308 | A | 10/1997 | Meissner et al. |
| 5,676,201 | A | 10/1997 | Klaren |
| 6,066,701 | A | 5/2000 | Koveal et al. |
| 6,306,981 | B1 | 10/2001 | Brown et al. |
| 6,441,108 | B1 | 8/2002 | Haendeler et al. |
| 6,444,763 | B1 | 9/2002 | Sagae et al. |
| 6,518,372 | B1 | 2/2003 | Weickert |
| 6,689,845 | B1 | 2/2004 | Govoni et al. |
| 7,270,791 | B2 | 9/2007 | Davis et al. |
| 7,601,303 | B1 | 10/2009 | Karer et al. |
| 2006/0058474 | A1 | 3/2006 | Covezzi et al. |
| 2006/0063896 | A1* | 3/2006 | McElvain et al. ............ 526/70 |
| 2007/0217966 | A1 | 9/2007 | Heino et al. |
| 2009/0149610 | A1 | 6/2009 | Sato et al. |
| 2009/0149620 | A1 | 6/2009 | Sato et al. |
| 2010/0069581 | A1 | 3/2010 | Ogawa et al. |
| 2010/0311923 | A1 | 12/2010 | Sato et al. |

FOREIGN PATENT DOCUMENTS

| | | |
|---|---|---|
| EP | 0 088 638 A2 | 9/1983 |
| EP | 0 101 893 A2 | 3/1984 |
| EP | 0 241 947 A2 | 10/1987 |
| EP | 0 381 364 A1 | 8/1990 |
| EP | 1 484 343 A1 | 12/2004 |
| GB | 845655 A | 8/1960 |
| GB | 954078 | 4/1964 |
| GB | 1147273 A | 4/1969 |
| GB | 1233106 A | 5/1971 |
| GB | 1351624 A | 5/1974 |
| GB | 1587891 A | 4/1981 |
| GB | 2077628 A | 12/1981 |
| JP | 41-12916 | 7/1966 |
| JP | 46-11670 | 3/1971 |
| JP | 46-31969 | 9/1971 |
| JP | 47-42379 | 10/1972 |
| JP | 58-201802 A | 11/1983 |
| JP | 58-216735 A | 12/1983 |
| JP | 59-42039 A | 3/1984 |
| JP | 59-21321 B2 | 5/1984 |
| JP | 59-126406 A | 7/1984 |
| JP | 2-233708 A | 9/1990 |
| JP | 6-76239 B2 | 9/1994 |
| JP | 2675919 B2 | 11/1997 |
| JP | 2000-302807 A | 10/2000 |
| JP | 2002-515516 A | 5/2002 |
| JP | 2002-520426 A | 7/2002 |
| JP | 3352059 B2 | 9/2002 |
| JP | 2002-537420 A | 11/2002 |
| JP | 2003-277412 A | 10/2003 |
| JP | 2006-502263 A | 1/2006 |
| SU | 1295183 A1 | 3/1987 |
| WO | WO 93/24533 A1 | 12/1993 |
| WO | WO 99/59712 A1 | 11/1999 |
| WO | WO 02/40547 A1 | 5/2002 |
| WO | WO 2007/071527 A1 | 6/2007 |

OTHER PUBLICATIONS

Mathur et al., "Spouted Beds", Academic Press, 1974, pp. 114-116 and 279-280.
Restriction Requirement issued Apr. 8, 2010, in U.S. Appl. No. 12/332,112.
Singapore Search Report, dated Jun. 2, 2011, for Singapore Application No. 201008798-9.
U.S. Office Action issued May 26, 2011, in U.S. Appl. No. 12/332,112.
Hattori et al., "Minimum Spoutable Gas Flow Rate in Side-Outlet Spouted Bed with Inner Draft-Tube," Journal of Chemical Engineering of Japan, vol. 14, No. 6, 1981, pp. 462-466.
Notice of Allowance dated Apr. 18, 2011 for U.S. Appl. No. 12/332,102.
Notice of Allowance dated Apr. 21, 2011 for U.S. Appl. No. 12/331,730.
Notice of Allowance dated Mar. 18, 2011 for U.S. Appl. No. 12/332,112.
Perry et al. (Editors), "Solids-Drying Equipment", Perry's Chemical Engineers' Handbook, McGraw-Hill, 1997, pp. 12-75 and 12-76.
Search Report dated Apr. 22, 2009 for Singapore Application No. 200809160-5.
Search Report dated May 4, 2009 for Singapore Application No. 200809157-1.
Search Report dated May 4, 2009 for Singapore Application No. 200809158-9.
Search Report dated May 4, 2009 for Singapore Application No. 200809159-7.
Search Report dated May 4, 2009 for Singapore Application No. 200809161-3.
Search Report dated Nov. 10, 2010 for Singapore Application No. 201004966-6.
Society of Power Technology, Nikkan Kogyo Shimbun-sha (Editor), Terminology Dictionary of Powder Technology, 2nd Edition, Mar. 30, 2000, p. 321.
Takeda et al., "Modified types of Spouted bed—With the gas outlet located in the side wall surrounding the annular dense bed," Kagaku Kogaku Ronbunshu 1, Kagaku Kogaku Kyokai, vol. 1, No. 2, 1975, pp. 149-154.
U.S. Office Action dated Dec. 7, 2010 for U.S. Appl. No. 12/332,065.
U.S. Office Action dated Jun. 15, 2010 for U.S. Appl. No. 12/332,055.
U.S. Office Action dated Jun. 3, 2010 for U.S. Appl. No. 12/332,112.
U.S. Office Action dated Mar. 11, 2011 for U.S. Appl. No. 12/331,730.
U.S. Office Action dated Mar. 16, 2011 for U.S. Appl. No. 12/332,102.
U.S. Office Action dated Nov. 12, 2010 for U.S. Appl. No. 12/332,112.
Hatate et al. "Flow Characteristics of Draft Tube Spouted Bed and its Application", Journal of the Society of Powder Technology, vol. 34, No. 5, May 1997, pp. 343-360.
Ishikura et al., "Hydordynamics of a Spouted Bed with a Porous Draft Tube", 1996, pp. 615-621.
Ishikura et al., "Hydrodynamics of Modified Spouted Beds for Binary Mixtures of Particles—Effect of the Aeration Gas Flow Rate from Side Distributor", 1997, pp. 155-165.
Ishikura, "Regime Map of Binary Particle Mixture in a Spourt-Fluid Bed", 1993, pp. 1189-1192.
Mathur et al., "Spouted Beds", Academic Press, 1974, pp. 263-264.
Takenaka et al., "Fluidity characteristics of a spouted bed with a cylinder to cone-shaped perforated draft tubes", SCEJ 71st Annual Meeting, J123, 2006.
Weickert et al., Chemie Ingenieur Technik, 2005, 77, No. 8, pp. 977-978.
Yokokawa, "Fluidizing characteristics of fluidized bed and spouted bed and their application", Journal of the Society of Powder Technology, vol. 21, No. 11, Nov. 1984, pp. 715-723.
U.S. Office Action dated May 6, 2011 for U.S. Appl. No. 12/332,065.
Mathur et al., "A Technique for Contacting Gases with Coarse Solid Particles," A.I.Ch.E Journal, vol. 1, No. 2, Jun. 1955, pp. 157-164.
Cube Action for U.S. Appl. No. 12/332,112, mailed on Jan. 20, 2012.

* cited by examiner (a)

(b)

(a)

(b)

(a)

(b)

(c)

(a)

(b)

(a)

(b)

SPOUTED-FLUIDIZED BED-TYPE OLEFIN POLYMERIZATION REACTOR

BACKGROUND OF THE INVENTION

1. Field of the Invention

The present invention relates to an olefin polymerization reactor, a polyolefin production system, using a spouted-fluidized bed or spouted bed, and a process for producing polyolefins such as polyethylene and polypropylene by using such reactor and system.

2. Related Background Art

Olefin polymerization reactors which polymerize, within a vessel and in the presence of a catalyst, an olefin monomer fed in as a gas or liquid to form granular polyolefin particles are known to the art. Some of the reactors use an extremely simplified gas-phase polymerization process using a fluidized bed in which a step of dispersing, purifying, and recovering the solvent is omitted and granular polyolefin particles that do not require drying are obtained by polymerization.

Japanese Translation of PCT Application No. 2002-520426, European Patent Application No. 1484343, Japanese Translation of PCT Application Publication No. 2006-502263, Japanese Patent Application Laid-open No. S59-42039, Japanese Translation of PCT Application No. 2002-515516, Japanese Patent Application Laid-open No. S58-216735, WO 02/40547, and G Weickert, Chemie Ingenieur Technik 2005, 77, no. 8, p. 977 to p. 978 describe fluidized-bed apparatuses that include a variety of improvements. With the apparatuses described in Japanese Translation of PCT Application No. 2002-520426, European Patent Application Publication No. 1484343, Japanese Translation of PCT Application No. 2006-502263, and G Weickert, Chemie Ingenieur Technik 2005, 77, no. 8, p. 977 to p. 978, from among the aforementioned apparatuses, it is possible to produce polyolefins with a wide molecular weight distribution or polymer composition distribution by providing locally a zone in a region where polyolefin particle circulate, this zone being different in gas composition from other regions.

A technique, although not relating to the production of polyolefins, is also known by which solid particles are brought into contact with a fluid by using a flow called a spouted bed (see Akira Yokogawa, *Funtai Kogaku Kaishi* (Journal of the Society of Powder Technology, Japan), 1984, vol. 21, No. 11, p. 715 to p. 723). A technique is also known by which a draft tube is used as means for stabilizing a spouted bed (see Japanese Examined Patent Publication No. H6-76239, U.S. Pat. No. 4,373,272, Japanese Patent Publication No. 3352059; Yasuo Hatade et al. *Funtai Kogaku Kaishi* (Journal of the Society of Powder Technology, Japan), 1997, vol. 34, No. 5, p. 343 to p. 360; Sohei Takenaka et al. *Kagaku Kogakukai, Dai 71 Kainen Kai Koen Yoshi* (proceedings of the Society of Chemical Engineers, Japan, the $71^{st}$ Meeting), J123, 2006; Toshifumi Ishikura, *Kagaku Kogaku Rombunshu* (collection of theses, the Chemical Engineers), 1996, VOL. 22, No. 3, p. 615 to p. 621). A technique is also known for using a draft tube in the production of polyolefins when a fluidized bed is used (see WO 02/40547).

From the standpoint of achieving high contact efficiency of particles and fluid, apparatuses using a flow called spouted-fluidized bed have been also studied (see Kishan B. Mathur et al. "SPOUTED BEDS", ACADEMIC PRESS, INC. 1974, p. 263 to p. 264; Toshifumi Ishikura, *Kagaku Kogaku Rombunshu* (collection of theses, the Chemical Engineers) 1993, VOL. 19, No. 6, p. 1189 to p. 1192; Toshifumi Ishikura et al. *Fukuoka Daigaku Kogaku Shuho* (Collection of engineering theses, Fukuoka University, 1997, March, No. 58, p. 155 to p. 165). These apparatuses are provided with a gas introducing opening for forming a spouted bed and a dispersion plate for forming a fluidized bed. A technique of using a draft tube and a dispersion plate is described by Kishan B. Mathur et al. "SPOUTED BEDS", ACADEMIC PRESS, INC. 1974, p. 263 to p. 264.

SUMMARY OF THE INVENTION

However, shipping of polyolefin materials is generally conducted by heating and melting the polyolefin particles and processing them into pellets. The major reason therefor is that the polyolefin particles obtained by polymerization have a small particle size and are unsuitable for handling during molding. Therefore, catalysts and processes have been developed that enable the production of large-diameter polyolefin particles that make it possible to omit the pelletizing process.

However, the problem is that in order to handle polyolefin particles having a larger diameter (an average particle diameter of about 2 to 5 mm) in the conventional fluidized bed apparatus, the gas flow rate is increased in order to fluidize the particles.

In a variety of recently developed different polyolefin production processes, polyolefin particles with high cohesion ability due, for example, to a high content of component ingredient, are sometimes processed. The problem arising in such cases is that flow defects easily occur in the conventional fluidized bed-type apparatus and the gas flow rate necessary to enhance the fluidization increases.

It is therefore an object of the present invention to provide an olefin polymerization reactor in which fluidization can be conducted at a comparatively low blowing rate even when polyolefin particles of a large diameter and high cohesion ability are handled and also to provide a polyolefin production system equipped with such an olefin polymerization reactor. Another object of the invention is to provide a polyolefin production process which uses such an olefin polymerization reactor or polyolefin production system.

The olefin polymerization reactor of spouted-fluidized bed-type in accordance with the present invention comprises: a vertically extending cylinder; a decreasing diameter portion on the cylinder, having an inside diameter that decreases progressively downward, and having a gas inlet orifice at a bottom end thereof; and a plurality of through holes passing through from an outside surface towards an inside surface of the decreasing diameter portion, wherein a reaction is conducted inside a reaction zone enclosed by the inside surface of the decreasing diameter portion and an inside surface above the decreasing diameter portion of the cylinder.

In the olefin polymerization reactor in accordance with the present invention, a polymerization reaction of the olefin is induced within a reaction zone in which polyolefin particles containing a catalyst are located and the polyolefin particles are grown. With such a reactor, a spouted-fluidized bed or a spouted bed can be formed within the reaction zone by regulating the amount of gas fed from the gas inlet orifice and the plurality of through holes. By contrast with a fluidized bed, the spouted-fluidized bed and spouted bed have a spout portion with a high gas flow velocity. Therefore, polyolefin particles of a larger diameter and high cohesion ability can be completely fluidized at a comparatively low blowing rate.

In this reactor, a spouted bed of polyolefin particles can be formed within the reaction zone by controlling an amount of an olefin-containing gas fed into the reaction zone so that an amount of the olefin-containing gas flowing around a spout portion formed in the center of the reaction zone is less than a minimum fluidization velocity. As used herein, "spouted bed" refers to a particle bed state characterized by the circulatory movement of particles, wherein there forms, in a particle bed composed of polyolefin particles (sometimes referred to below as simply "particles") and under the action of an olefin-containing gas from the gas inlet orifice, a "spout" (or spout portion) which has a dilute particle concentration near the center axis of the cylinder and in which particles flow upward together with the gas, and at the same time there also forms at the periphery of the spout an annular structure where particles fall in a moving bed state under the influence of gravity.

A portion of the olefin-containing gas blown in from the gas inlet orifice forms the spout and sweeps past the particle bed, and the remainder diffuses into the portion of the particle bed having an annular structure. The solid-gas contact between the olefin-containing gas and polyolefin particles in this way allows the polyolefin particles to grow through olefin polymerization within the reaction zone. In the reactor in accordance with the present invention, a plurality of through holes are provided in the decreasing diameter portion. By feeding the olefin-containing gas into the reaction zone through these through holes, it is possible to achieve a sufficiently high solid-gas contact efficiency. Further, by increasing the amount of gas fed to the reaction zone to a level equal to or higher than the minimum fluidization velocity, it is possible to form the spouted-fluidized bed in the zone.

Generally, when compared with a fluidized bed, a spouted bed is known to be capable of exhibiting an excellent performance in terms of pressure loss and, owing to circulatory movement of the particles, to give rise to mixing which somewhat approximates plug flow. Therefore, an advantage of the spouted bed-type olefin polymerization reactor according to the present invention is that it can make the residence time distribution of particles in the reaction zone narrower than in the conventional reactors which employ a fluidized bed.

It is preferred that the olefin polymerization reactor according to the invention further comprises a draft tube provided inside the cylinder and extending upward from a position spaced apart from the gas inlet orifice. By disposing the draft tube inside the reaction zone, it is possible to form a spouted bed which ensures both high stability and low pressure loss at a high level of effectiveness.

It is preferred that the olefin polymerization reactor according to the invention further comprises, within the reaction zone, a first conical baffle disposed at a position above the gas inlet orifice, and which has an outside diameter that increases progressively downward, and is closed at a top end thereof, and a bottom end of which is spaced apart from an inside wall of the cylinder.

In the convention fluidized bed-type apparatus, a fixed freeboard zone has to be ensured to inhibit particle scatter. In the apparatus according to the invention, the first conical baffle that is disposed at a position above the gas inlet orifice within the reaction zone acts as a deflector preventing the spouted particles from scattering. Therefore, the freeboard zone can be shortened and it is possible to attain volume efficiency which is higher than that in the fluidized bed-type apparatus. Further, when a drift tube is provided within the reaction zone, it is preferred that the first conical baffle be disposed above the top end opening of the drift tube.

It is preferred that the olefin polymerization reactor according to the invention has a plurality of the reaction zones and polyolefin particles pass sequentially through the reaction zones. Further, from the standpoint of saving space in the apparatus, it is preferred that the plurality of reaction zones are each formed in a vertical row and the polyolefin particles pass sequentially from an upper reaction zone to a lower reaction zone. However, by using an ejector or the like, it is also possible to cause the polyolefin particles to pass from the lower reaction zone to the upper reaction zone. By providing a plurality of reaction zones to obtain a multistage spouted base configuration, it is possible to decrease sufficiently the residence time distribution of the particles. Further, since mixing which somewhat approximates plug flow can be realized in the spouted bed, by contrast with the conventional fluidized bed, as described hereinabove, the residence time distribution can be narrowed to the same degree with a smaller number of stages than that required in the fluidized bed.

Such an olefin polymerization reactor in which a plurality of reaction zones are provided in a row, thereby providing a multistage spouted bed, as described hereinabove, preferably comprises means for transferring the polyolefin particles from the reaction zone on the upstream side to the reaction zone on the downstream side.

In accordance with the present invention, from the standpoint of spouted bed stability, it is preferred that the ratio $D_O/D_R$ between the orifice diameter $D_O$ of the gas inlet orifice and the cylinder inside diameter $D_R$ is 0.35 or less.

It is preferred that the olefin polymerization reactor according to the invention further comprises a tubular portion extending downward from an edge of the gas inlet orifice of the decreasing diameter portion. Where gas is introduced from the tubular portion into the reaction zone, the upward gas flow within the reaction zone is sufficiently stabilized in comparison with that in a case in which such tubular portion is not provided and the gas is simply introduced from the gas inlet orifice. As a result, even if the flow velocity of the introduced gas and the amount of particles within the reaction zone somewhat fluctuate, the fluidized state of the spouted bed can be sufficiently maintained. Further, the advantage of providing the tubular portion is that, although the particles tend to fall downward from the gas inlet orifice under gravity, they are lifted by the gas flowing from below in the conduit of the tubular portion and are easily returned again into the reaction zone.

It is preferred that the tubular portion further comprises a partition wall that partitions the conduit of the tubular portion in the horizontal direction. Where the tubular portion having a partition wall is used, the lifting effect produced on particles that tend to fall downward from the gas inlet orifice is increased and the number of falling particles can be further decreased.

It is preferred that the olefin polymerization reactor according to the invention further comprises a cylindrical member closed at least one end thereof and installed inside the tubular portion, and the conduit before reaching the gas inlet orifice have an annulus formed by an outside surface of the cylindrical member and an inside surface of the tubular portion. Such a configuration makes it possible to obtain a ring-like cross section in the horizontal direction of the conduit and has the following advantage over a configuration using a conduit of a round cross section of the same area. First, the lifting effect produced on particles that tend to fall downward from the gas inlet orifice is increased over that attained with a round conduit and the number of falling particles can be further decreased. Further, the above-described configuration is effective when the reactor is scaled up. In other words, even when the gas inlet orifice is expanded, the ring-like cross section of the flow channel leading thereto makes it possible to obtain a narrower orifice spacing and form a stable spouted bed easier than in the case of a round cross section.

The olefin polymerization reactor according to the invention may further comprise a closure plate that closes the bottom end of the tubular portion, a gas inlet pipe that has a conduit smaller than the tubular member conduit and is provided so as to pass through the closure plate, and a second conical baffle that has an outside diameter that increases progressively downward, and is closed at a top end thereof, and a bottom end of which is spaced apart from an inside surface of the tubular portion, wherein the second conical baffle is installed directly above the top end of the gas inlet pipe. With the reactor of such a configuration, the second conical baffle acts as a plate preventing the particles from falling. Therefore, the particles can be sufficiently prevented from falling through the gas inlet orifice even when the gas supply is stopped.

It is preferred that the olefin polymerization reactor according to the present invention further comprises a pipe that communicates with the inside of the draft tube and feeds a gas or liquid into the draft tube. By feeding a gas or liquid into the draft tube through the pipe, it is possible to obtain a gas composition inside the draft tube that differs from a gas composition outside the draft tube. As a result, homogeneous polyolefin particles with a wide molecular weight distribution or copolymer composition distribution can be produced.

With the polyolefin production process according to the invention, olefin polymerization is carried out by using the above-described olefin polymerization reactor. With the process according to the invention, a spouted bed can be formed within the reaction zone in the below-described modes. Thus, with the above-described process, a spouted bed of polyolefin particles can be formed within the reaction zone by controlling an amount of an olefin-containing gas fed into the reaction zone so that an amount of the olefin-containing gas flowing around a spout portion formed in a center of the reaction zone is less than a minimum fluidization velocity.

With the production process according to the invention, compositions of gases present inside and outside the draft tube within the reaction zone may be made to differ from each other by feeding a gas and/or liquid into the draft tube through the pipe.

The polyolefin production process according to the invention may include the steps of continuously feeding olefin to the olefin polymerization reactor through the gas inlet orifice and the plurality of through holes and at the same time continuously removing a gas containing unreacted olefin from the olefin polymerization reactor and returning the removed gas to the olefin polymerization reactor; and cooling part or all of the removed gas so as to obtain an olefin-containing condensate. In this case, it is preferred that the condensate be fed to a spout portion formed within the reaction zone of the olefin polymerization reactor. As a result, latent heat of vaporization of the condensate can be used and heat can be efficiently withdrawn by the condensate from the olefin polymerization reactor. Further, when the olefin polymerization reactor is equipped with the first conical baffle, the condensate may be fed to the lower portion the first conical baffle. This has the advantage of enabling a condensate feeding line to be installed using the first conical baffle as a fitting.

The polyolefin production system according to the invention includes an olefin pre-reactor for polymerizing olefin in the presence of an olefin polymerization catalyst and forming polyolefin particles, and the above-described olefin polymerization reactor in accordance with the invention which is connected as a subsequent stage to the olefin pre-reactor. The polyolefin production process according to the invention includes carrying out multistage olefin polymerization by using the above-described polyolefin production system.

The invention enables fluidization at a comparatively low blowing amount even when polyolefin particles of large diameter and cohesive ability are handled.

Figure 6:
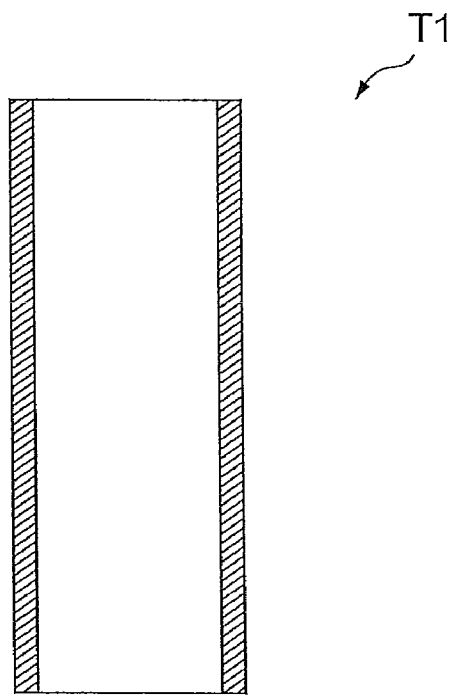
Figure 6:
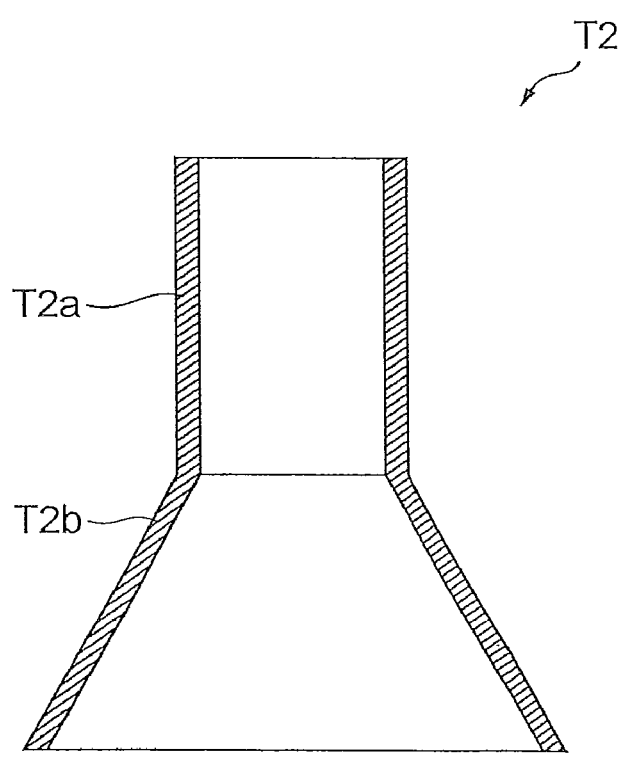
Figure 7:
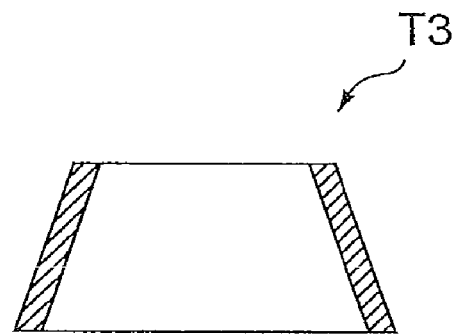
Figure 7:
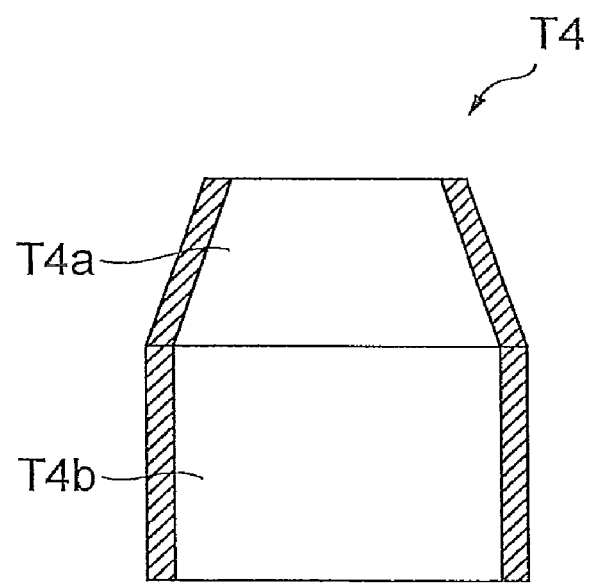
Figure 8:
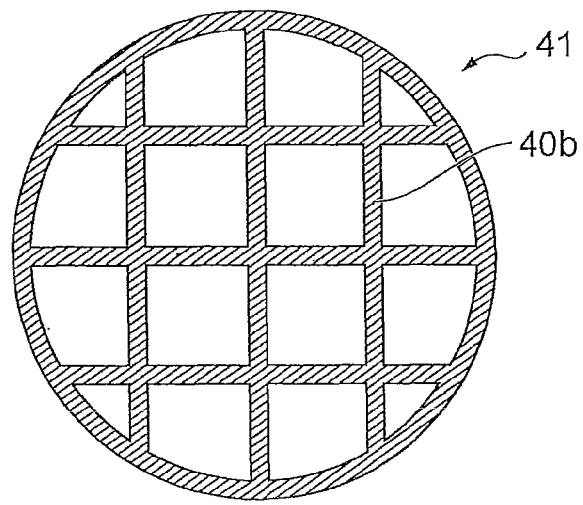
Figure 8:
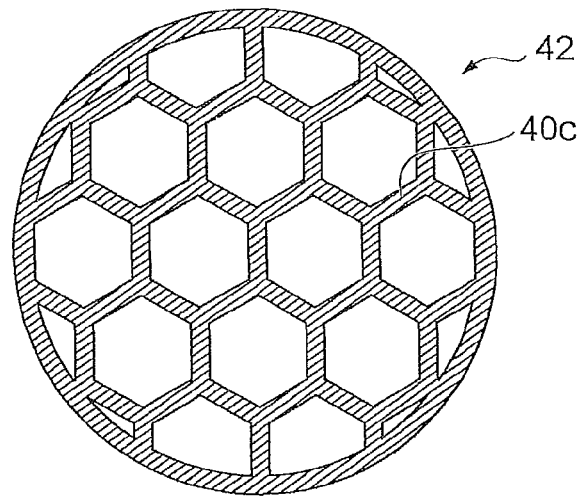
Figure 8:
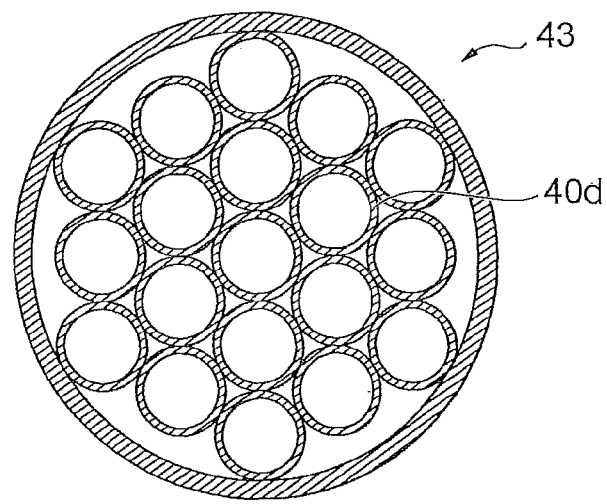
Figure 9:
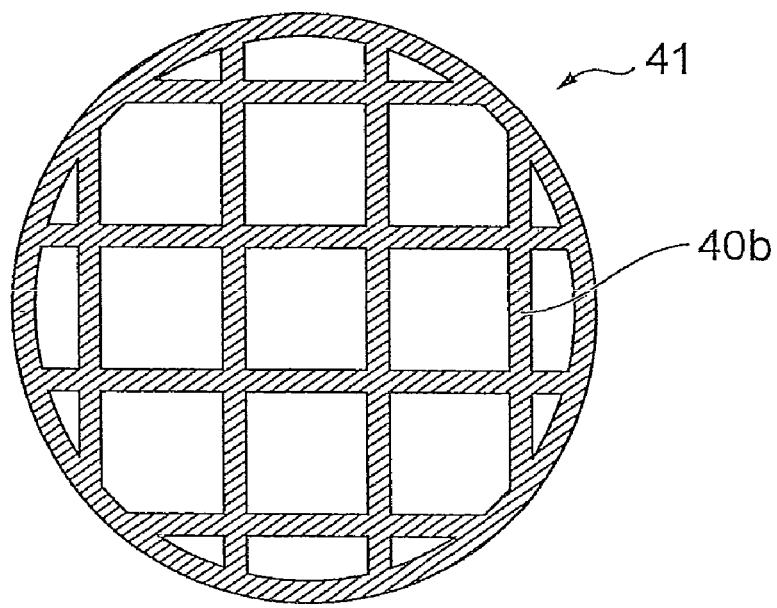
Figure 9:
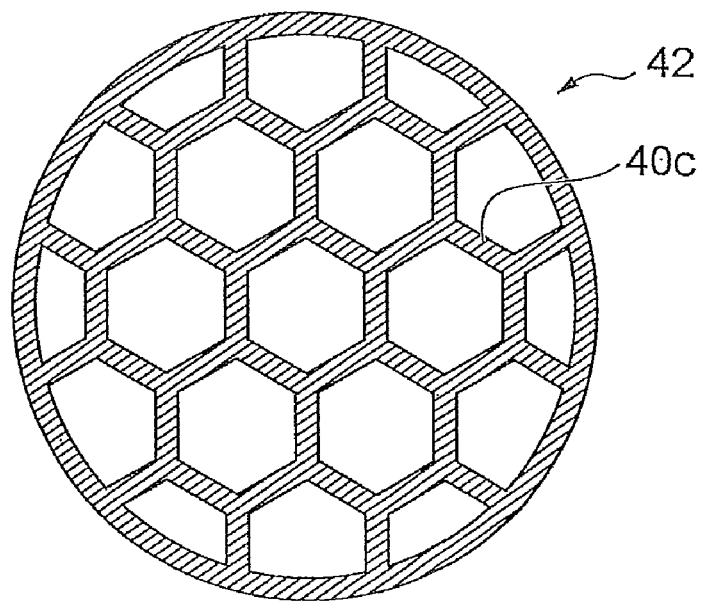
Figure 10:
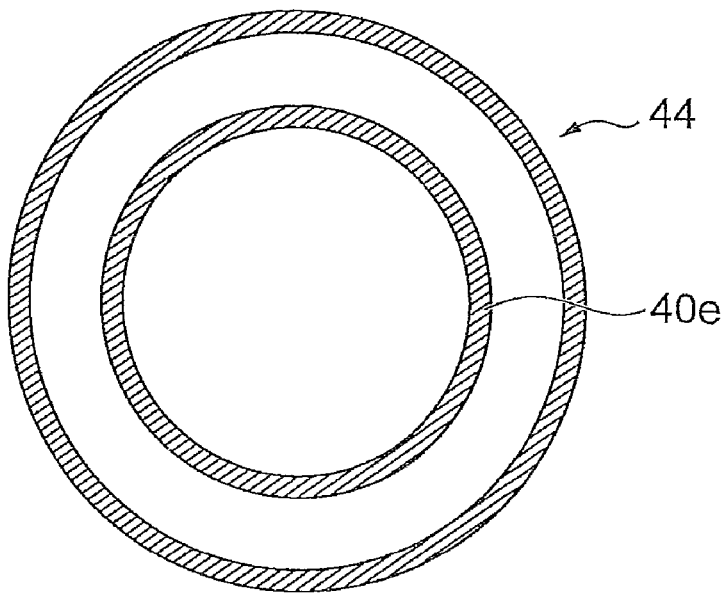
Figure 10:
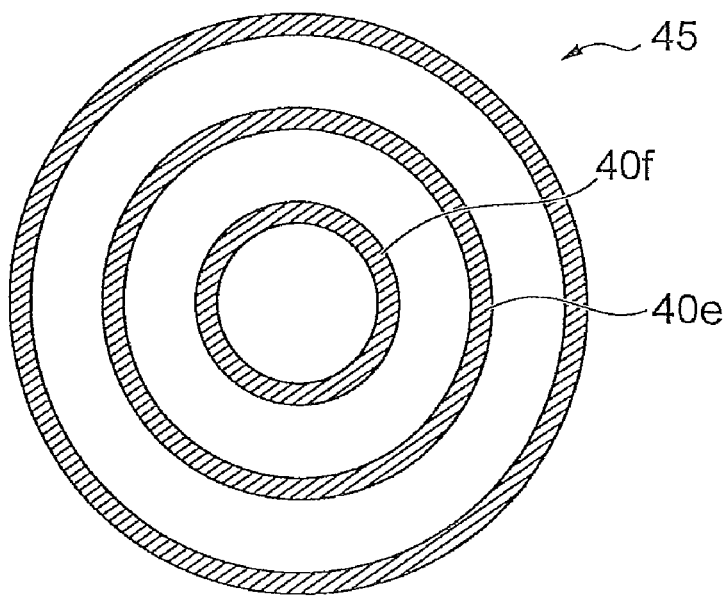
Figure 11:
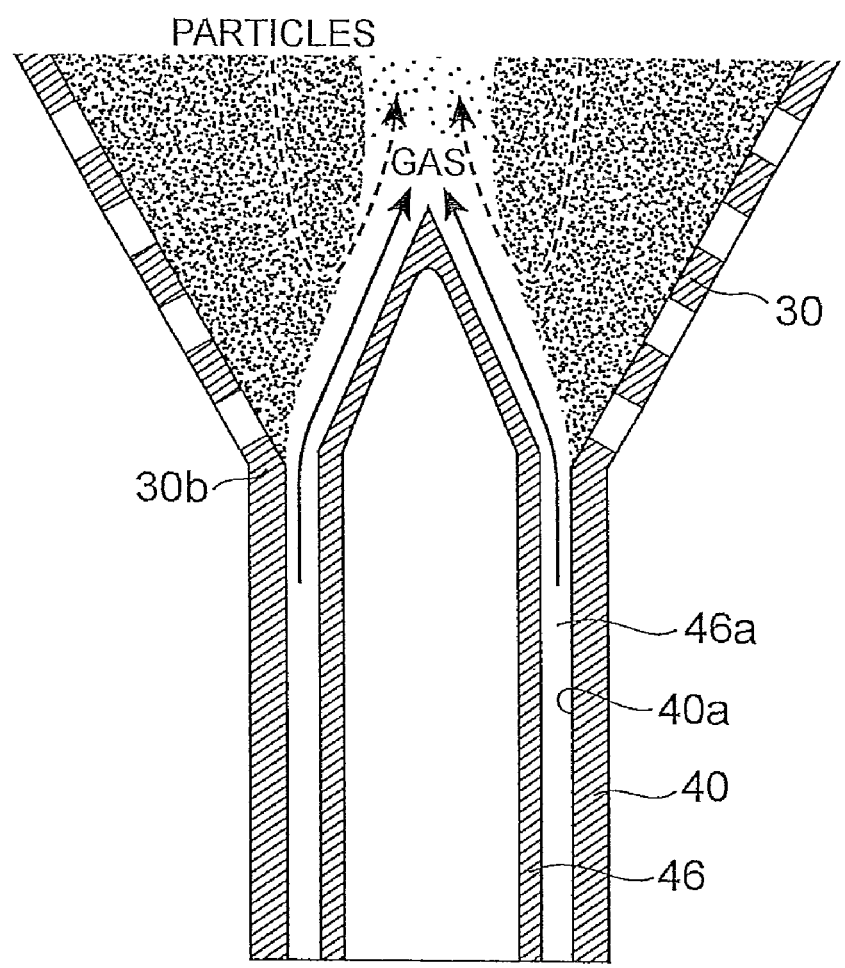
Figure 12:
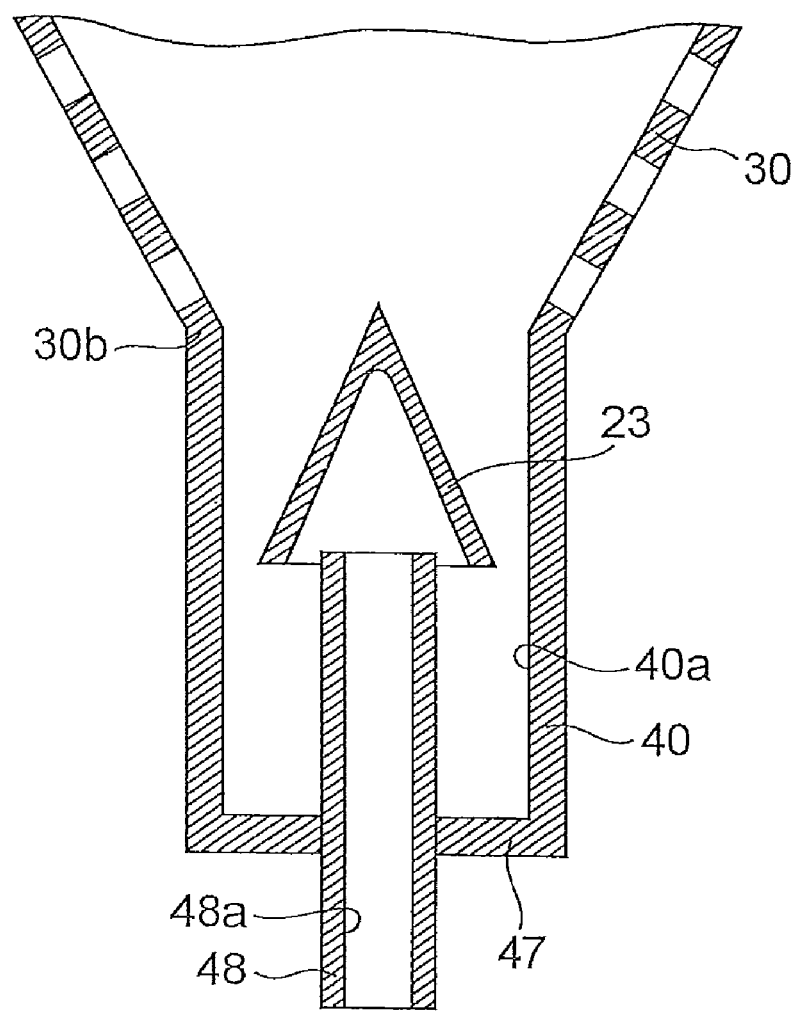
Figure 13:
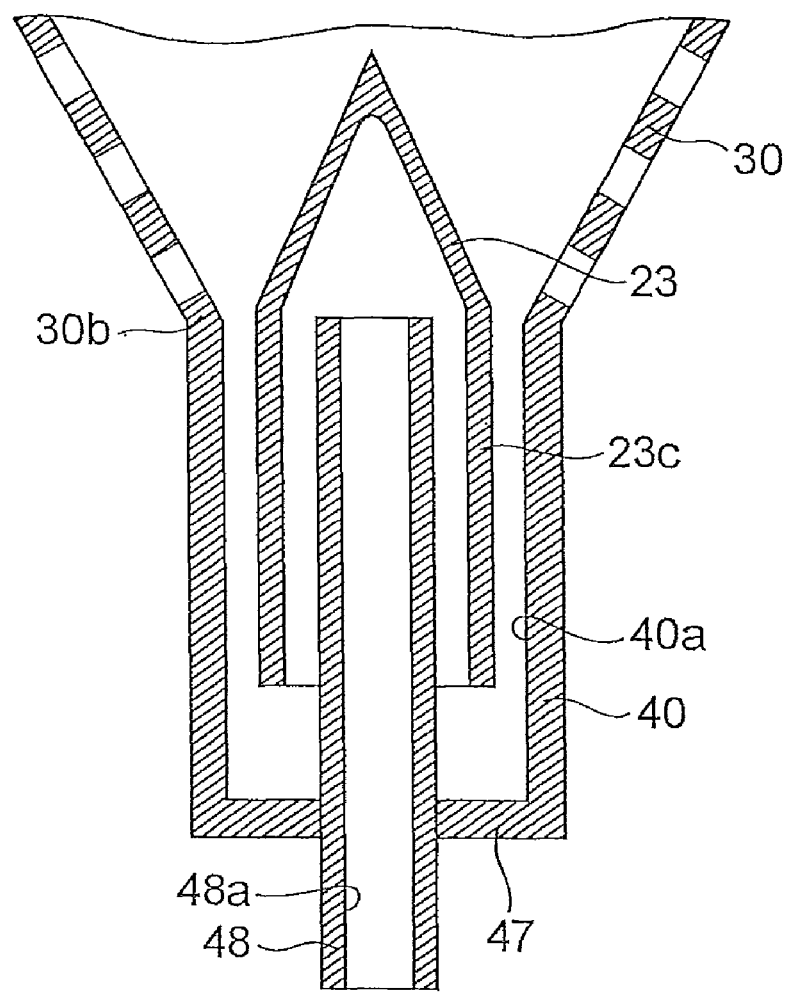
Figure 14:
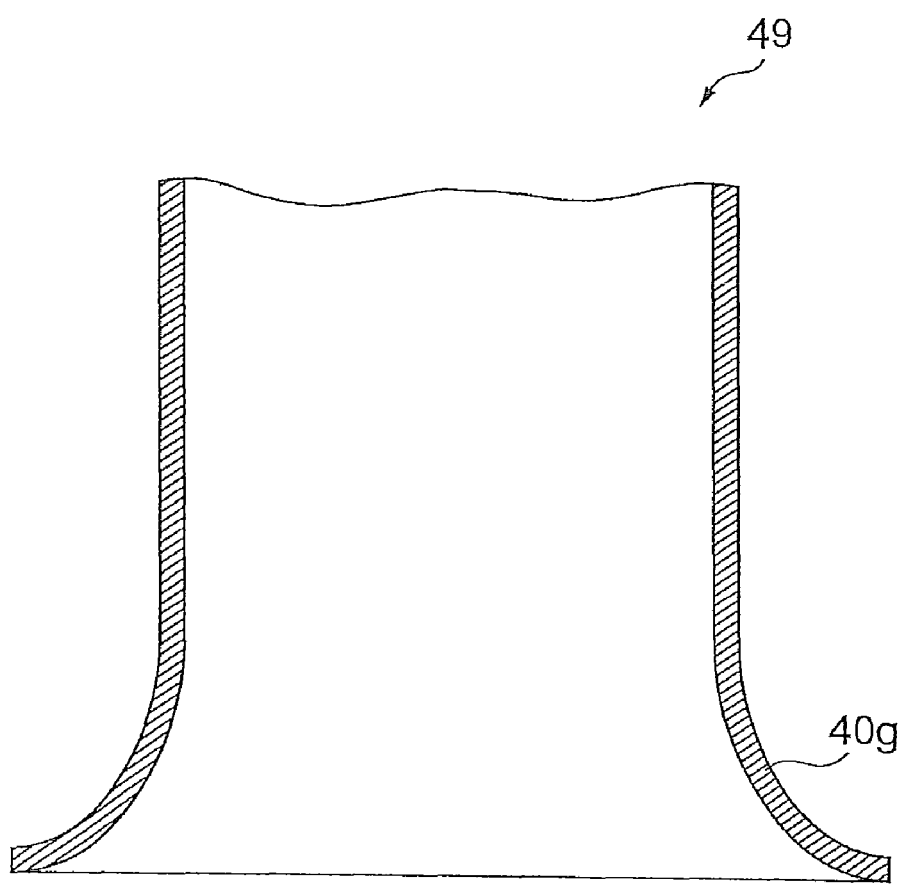

(a) and (b) of FIG. 6 are cross-sectional views illustrating the configuration of the draft tube;

(a) and (b) of FIG. 7 are cross-sectional views illustrating the configuration of the draft tube;

(a) to (c) of FIG. 8 illustrate the configuration of the gas inlet portion;

(a) and (b) of FIG. 9 illustrate the configuration of the gas inlet portion;

(a) and (b) of FIG. 10 illustrate the configuration of the gas inlet portion;

FIG. 11 is a schematic cross-sectional view illustrating a tubular portion provided with a cylindrical member;

FIG. 12 is a schematic cross-sectional view illustrating a tubular portion provided with a gas inlet pipe and a second conical baffle;

FIG. 13 is a schematic cross-sectional view illustrating the gas inlet pipe and the second conical baffle provided in the tubular portion; and FIG. 14 is a schematic cross-sectional view illustrating an extension tube having a low end of a bell mouth shape.

DESCRIPTION OF THE PREFERRED EMBODIMENTS

First Embodiment

Polyolefin Production System

Figure 1:
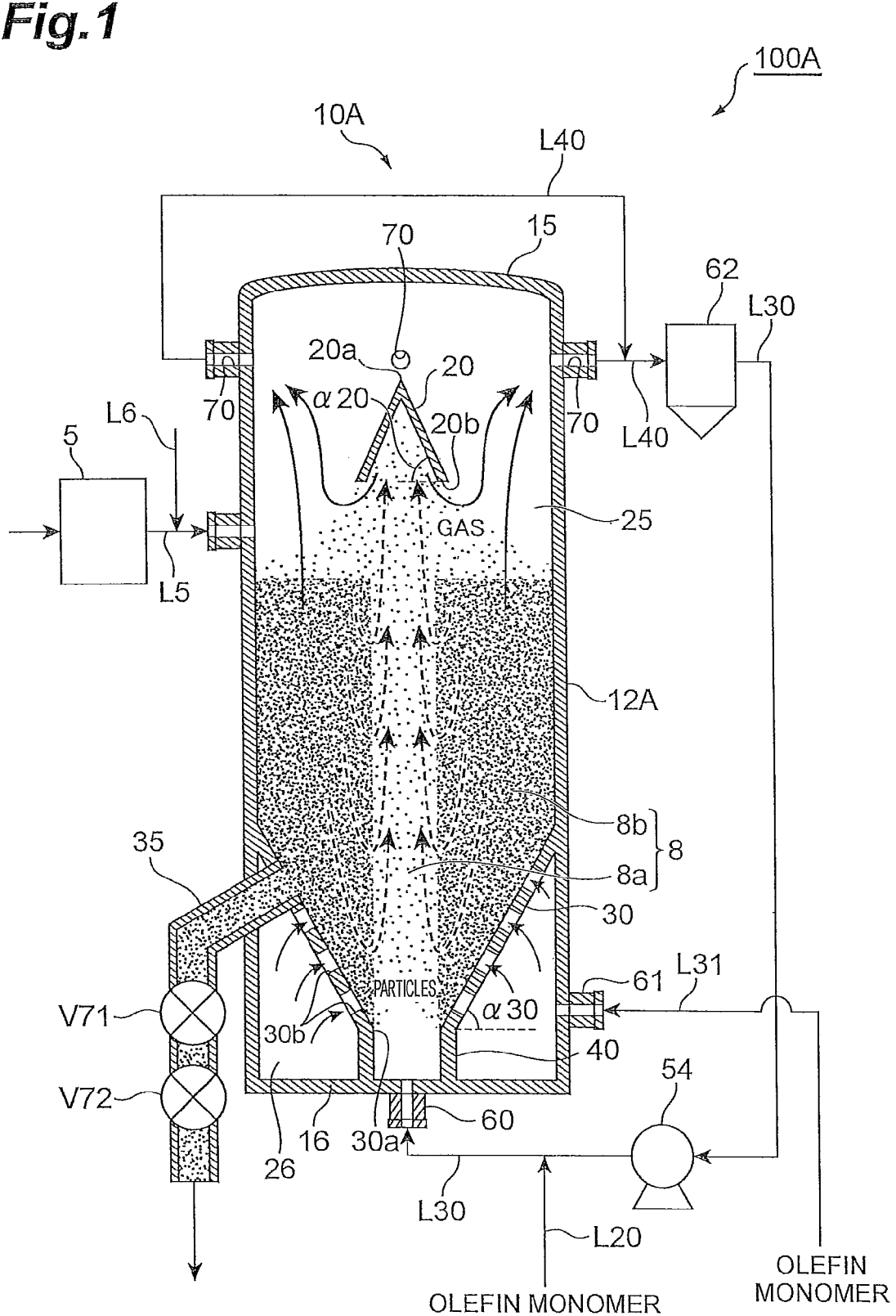
FIG. 1 is a schematic structural view of an embodiment of the polyolefin production system according to the present invention.

FIG. 1 shows a polyolefin production system 100A according to the first embodiment. This production system 100A includes an olefin prepolymerization reactor 5 and an olefin polymerization reactor 10A which is connected as a subsequent stage to the olefin prepolymerization reactor 5.

Olefin Prepolymerization Reactor

The olefin prepolymerization reactor 5 polymerizes olefin in the presence of an olefin polymerization catalyst to form polyolefin particles.

Examples of the olefin prepolymerization reactor 5 include, but are not limited to, slurry polymerization reactors, bulk polymerization reactors, stirred tank-type gas phase polymerization reactors, and fluidized bed-type gas phase polymerization reactors. Any one of these reactors may be used alone, a plurality of reactors of the same type may be used in combination, or two or more reactors of differing types may be used in combination.

Slurry polymerization reactors that may be used include known polymerization reactors, such as the stirred tank-type reactors and loop-type reactors described in Japanese Patent Publication No. S41-12916, Japanese Patent Publication No. S 46-11670 and Japanese Patent Publication No. S47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, octane) or an alicyclic hydrocarbon (e.g., cyclopentane, cyclohexane), an olefin polymerization catalyst is dispersed in the polymerization solvent to form a slurry, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.3 to 5 MPaG.

Bulk polymerization reactors that may be used include known polymerization reactors, such as the stirred tank-type reactors and loop-type reactors described in Japanese Patent Publication No. S41-12916, Japanese Patent Publication No. S 46-11670 and Japanese Patent Publication No. S47-42379. Bulk polymerization is a process in which an olefin monomer such as propylene or butene is used as the polymerization solvent in the substantial absence of inert solvents such as aliphatic hydrocarbons (e.g., propane, butane, isobutane, pentane, hexane, heptane, octane) and alicyclic hydrocarbons (e.g., cyclopentane, cyclohexane), an olefin polymerization catalyst is dispersed in the polymerization solvent, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.5 to 5 MPaG.

Stirred tank-type gas phase polymerization reactors that may be used include known polymerization reactors, such as the reactors described in Japanese Patent Application No. S46-31696 and Japanese Patent Application No. S59-21321. Stirred tank-type gas phase polymerization is a process in which a monomer in a gaseous state is used as the medium and, while maintaining an olefin polymerization catalyst and olefin polymer in a fluidized state within the medium by means of an agitator, the monomer in the gaseous state is polymerized. The polymerization temperature is generally from 50 to 110° C., and preferably from 60 to 100° C. The polymerization pressure should be in a range at which the olefin can be present as a vapor phase within the stirred tank-type gas phase polymerization reactor, and is generally from standard pressure to 5 MPaG, and preferably from 0.5 to 3 MPaG.

Fluidized bed-type gas phase polymerization reactors that may be used include known reactors, such as the reactors described in Japanese Patent Application Laid-open No. S58-201802, Japanese Patent Application Laid-open No. S59-126406 and Japanese Patent Application Laid-open No. H2-233708. Fluidized bed-type gas phase polymerization is a process in which a monomer in a gaseous state is used as the medium and, while maintaining primarily an olefin polymerization catalyst and olefin polymer in a fluidized state within the medium by the flow of the medium, the monomer in the gaseous state is polymerized. In some cases, an agitator is also provided to promote fluidization. The polymerization temperature is generally from 0 to 120° C., preferably from 20 to 100° C., and more preferably from 40 to 100° C. The polymerization pressure should be in a range at which the olefin can be present as a vapor phase within the fluidized bed-type reactor, and is generally from standard pressure to 10 MPaG, preferably from 0.2 to 8 MPaG, and more preferably from 0.5 to 5 MPaG.

Combinations of different reactors are exemplified by a slurry polymerization reactor or a bulk polymerization reactor, to which is connected, as the subsequent stage, a fluidized bed-type gas phase polymerization reactor or a stirred tank-type gas phase polymerization reactor.

Further, a flushing tank for separating unreacted olefin or polymerization solvent from olefin polymer particles may generally be provided between a slurry polymerization reactor or a bulk polymerization reactor and, connected thereto as the subsequent stage, a gas phase polymerization reactor such as a fluidized bed-type gas phase polymerization reactor, a stirred tank-type gas phase polymerization reactor or the subsequently described olefin polymerization reactor 10A. However, such a flushing tank is not always required; particularly in cases where a bulk polymerization reactor is used, a flushing tank is often not provided.

Olefin Polymerization Reactor

The olefin polymerization reactor 10A is a reactor which carries out, in a substantially gas phase state, an olefin polymerization reaction on polyolefin particles formed by the olefin prepolymerization reactor 5.

The olefin polymerization reactor 10A shown in FIG. 1 is composed primarily of a cylinder 12A which extends vertically, closure plates 15, 16 that close respectively the top and the bottom end of the cylinder 12A, a deflector (first conical baffle) 20 provided inside the cylinder 12A, and a tubular baffle (decreasing diameter portion) 30 that partitions the inside of the cylinder 12A into two zones. The deflector 20 and tubular baffle 30 are preferably disposed coaxially with the axis of the cylinder 12A. From the standpoint of stabilizing the spouted bed, the inside diameter of the cylinder 12A is preferably not more than 5 m, and more preferably not more than 3.5 m. In the olefin polymerization reactor 10A, a reaction zone 25 is formed by a lower surface of the closure plate 15, an inside surface of the cylinder 12A, and an inside surface of the tubular baffle 30. A bottom zone 26 is formed by an upper surface of the closure plate, an inside surface of the cylinder 12A, and an outside surface of the tubular baffle 30.

The olefin polymerization reactor 10A is so configured that a spouted-fluidized bed or spouted bed can be formed within the reaction zone 25 by controlling the amount of gas fed into the reaction zone 25. The case in which a fluidized bed 8 is formed within the reaction zone 25 by conducting control such that the amount of gas flowing around the spout portion formed in the center of the reaction zone 25 is less than the minimum fluidization velocity of the particles will be described below. When a spouted-fluidized bed is formed inside the reaction zone 25, the amount of gas may be controlled to a value that is equal to or higher than the minimum fluidization velocity. This has the advantage of enabling sufficient fluidization at a comparatively low blowing rate even when the particles have cohesion ability.

Within the reaction zone 25, an olefin-containing gas flows upward at a high velocity from a gas inlet orifice formed at a bottom end 30a of the tubular baffle 30, thereby forming a spouted bed 8 of polyolefin particles such as shown in FIG. 1. The spouted bed 8 is composed of a spout portion 8a and an annular particle bed 8b. A gas feed hole 61 is provided in a location corresponding to the inside of the bottom zone 26, and the olefin-containing gas can be introduced into the bottom zone 26 from the gas feed hole.

The tubular baffle 30 is a tapered cylinder which has an inside diameter that progressively decreases in the downward direction and is formed inside the cylinder 12A. The tubular baffle 30 is provided with an extension tube (tubular portion) 40 that extends downward from the edge of the gas inlet orifice and communicates with the hole 60. The extension tube 40 sufficiently stabilizes the upward flow of gas inside the reaction zone 25. The gas inlet orifice formed at the bottom end 30a of the tubular baffle 30 may have disposed thereon a check valve (not shown in the figure) so that polyolefin particles within the reaction zone 25 do not flow downward through the gas inlet orifice at such times as startup or temporary shutdown of the olefin polymerization reactor 10A.

Figure 2:
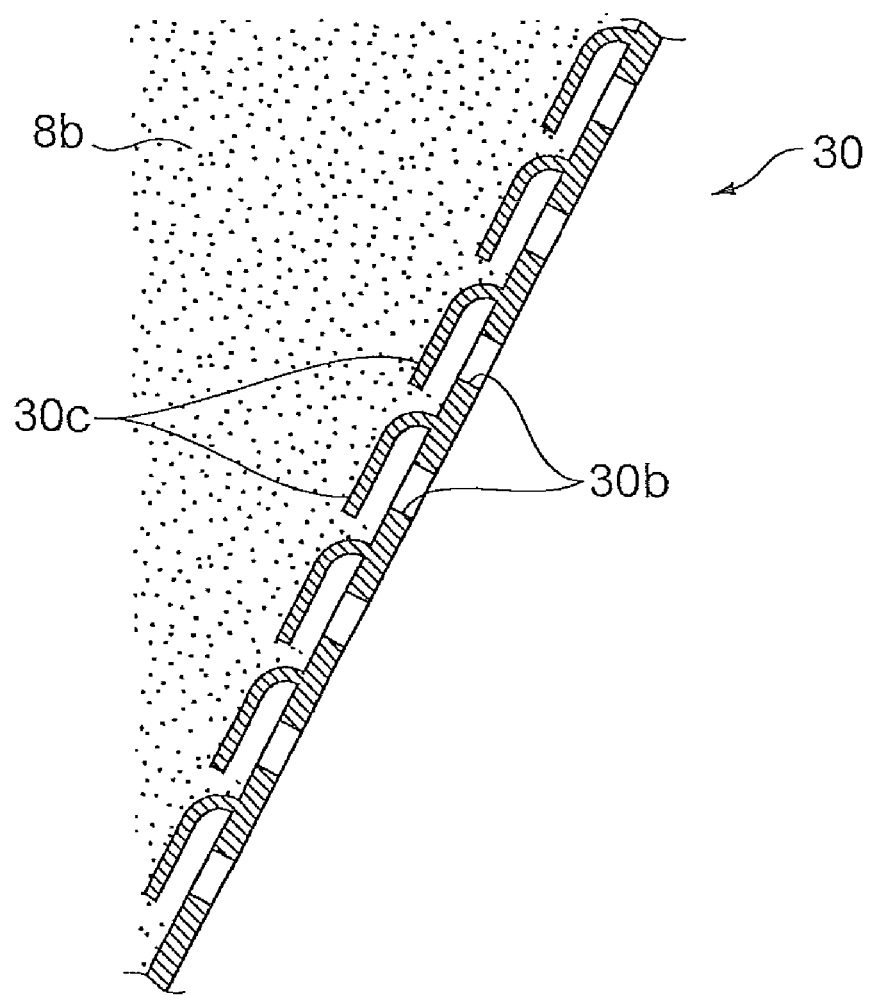
FIG. 2 is a schematic cross-sectional view illustrating an example of a bubble cap provided to cover a through hole.

The tubular baffle 30 has a plurality of through holes 30b that pass from the outside surface to the inside surface of the tubular baffle. Since the through holes 30b are provided in the tubular baffle 30, the olefin-containing gas from the bottom zone 26 diffuses toward the annular particle bed 8b inside the reaction zone 25. As a result, the solid-gas contact efficiency in the annular particle bed 8b is increased and the olefin polymerization can be further enhanced. From the standpoint of preventing the particles from falling through the through holes 30b into the bottom zone 26, it is preferred that a bubble cap 30c be provided on the inner surface of the tubular baffle 30 as shown in FIG. 2. The bubble cap 30c may be set to have a shape corresponding to the angle of repose of the particles and is not necessarily limited to the configuration shown in FIG. 2.

A deflector 20 is disposed at a position that lies above the tubular baffle 30 in the reaction zone 25 and faces the gas inlet orifice. The role of the deflector 20 is to prevent spouted polyolefin particles from scattering. This makes it possible to shorten the freeboard zone, enabling a high volume efficiency to be achieved.

The deflector 20 has a conical shape with a top end 20a that is closed, an outside diameter which increases progressively downward, and a bottom end 20b that is spaced apart from the inside wall of the cylinder 12A. As a result, particles that have been blown upward collide with the inside surface of the deflector 20 and are taken up into the annular particle bed 8b of the spouted bed 8. At the same time, gases pass below the bottom end 20b and are discharged from gas discharge nozzles 70.

The gas discharge nozzles 70 are formed in the cylinder 12A forming a side wall surface of the reaction zone 25, thereby enabling the discharge of gases located inside the reaction zone 25. In the olefin polymerization reactor 10A of the present embodiment, four gas discharge nozzles 70 are formed equidistantly along the circumferential direction of the cylinder 12A. The gas flowing in upward from the gas inlet orifice of the tubular baffle 30 is discharged sidewise from the four gas discharge nozzles 70, rather than being discharged as is from above the reaction zone 25. Therefore, the amount of gas diffusing into the annular particle bed 8b of the spouted bed 8 can be increased. As a result, the solid-gas contact efficiency of the particles and the olefin-containing gas in the annular particle bed 8b of the spouted bed 8 is increased. The gas discharge nozzles 70 are located preferably above the bottom end 20b of the deflector 20 within the reaction zone 25 and more preferably above the top end 20a of the deflector 20. By providing the gas discharge nozzles 70 at such a height, it is possible to decrease sufficiently the number of particles discharged together with the gas from the gas discharge nozzles 70. In the example herein, four gas discharge nozzles 70 are disposed, but this number of the gas discharge nozzles 70 is not limiting. Thus, the number of disposed gas discharge nozzles 70 may be more or less than four, but in order to ensure a uniform gas discharge, two or more particles are preferred.

To form the stable spouted bed 8 in the reaction zone 25, it is desirable that the tubular baffle 30 satisfy the following conditions. Namely, the ratio $(D_O/D_R)$ between the diameter $D_O$ of the gas inlet orifice at the bottom end 30a of the tubular baffle 30 and the inside diameter $D_R$ of the cylinder 12A is preferably 0.35 or less.

Also, the angle of inclination $\alpha 30$ of the tubular baffle 30 in FIG. 1, i.e., the angle of the inside surface of the tubular baffle 30 with the horizontal, is preferably at least the angle of repose for polyolefin particles present within the cylinder 12A. The angle of inclination $\alpha 30$ is more preferably at least the angle of repose and at least the angle at which the polyolefin particles can be completely discharged gravitationally. In this way, smooth downward movement of the polyolefin particles is achieved.

Although a spouted bed can be formed even by using a flat plate with a gas inlet orifice formed therein instead of a tubular baffle 30, a region where particles do not fluidize will arise on such a flat plate near the inside surface of the cylinder 12A. As a result, due to poor heat removal in this region, the particles may fuse together into masses. To avoid such a situation, it is thus desirable for the tubular baffles 30 to have an angle of inclination $\alpha 30$ which, as noted above, is at least a given angle.

When the inside surface of the tubular baffle 30 is an inclined surface as shown in FIG. 1, the gas from the bottom zone 26 mainly tends to pass via the through hole 30b close to the inside surface of the cylinder 12A due to a difference in the thickness of the annular particle bed 8b present above the tubular baffle 30. In order to obtain a uniform amount of gas passing through each through hole 30b, it is desirable that the shape and diameter of the through hole 30b be designed on the basis of pressure analysis results.

It is preferable for the deflector 20 in FIG. 1 to have an angle of inclination $\alpha 20$, i.e., the angle formed between the outside surface of the deflector 20 and the horizontal, which is at least the angle of repose for polyolefin particles present within the cylinder 12A. In this way, polyolefin particles can be adequately prevented from sticking to the deflector 20.

Polyolefin particles have an angle of repose of, for example, from about 35° to about 50°. The angles of inclination $\alpha 30$ and $\alpha 20$ are both preferably at least 55°.

The deflector 20 and tubular baffle 30 are each attached to the cylinder 12A by supports (not shown in the figure). The supports have substantially no influence on gas flow and polyolefin flow. The cylinder 12A, deflector 20 and tubular baffle 30 may be made of, for example, carbon steels or stainless steels having the Japanese Industrial Standard (JIS) designations SUS 304 or SUS 316L. When a catalyst containing a large amount of a corrosive ingredient (e.g., a halogen ingredient such as chlorine) is to be employed, it is preferable to use the stainless steel SUS 316L.

As shown in FIG. 1, a line L30 for feeding an olefin-containing gas is connected to a gas feeding nozzle 60 provided at the closure plate 16 of the reactor 12A, and olefin-containing gas is fed into the reaction zone 25 by a compressor 54 installed in the line. A line L31 for feeding an olefin-containing gas is connected to a gas feeding nozzle 61 provided at the cylinder 12A, and the olefin-containing gas is supplied into the bottom zone 26 by a compressor (not shown in the figure) installed in this line. The olefin-containing gases fed through the line L30 and the line L31 may be of the same kind or different.

In addition to the gas feeding nozzle 40, a discharge nozzle (not shown in the figure) which is capable of discharging polyolefin particles at the end of reactor operation may also be provided at the bottom of the cylinder 12A. Further, to reduce the amount of powder remaining inside the cylinder 12A at the end of reactor operation, it is preferable to dispose an interior member in the shape of an inverted cone (not shown in the figure) at a position where the member does not interfere with gas flow at the bottom of the cylinder 12A.

A gas discharge line L40 connected to the gas discharge nozzle 70 that discharges the gas from the reaction zone 25 is provided at the top of the cylinder 12A. In the gas discharged through the line L40, gas-entrained particles are removed by an optionally provided cyclone 62. After the gas has passed through a cooling means (not shown in the figure) or the like, the gas is recycled by the line L30. A line L20 for supplying an olefin monomer from the exterior into the line L30 is connected to the line L30.

In addition, a line L5 is connected to a position on the cylinder 12A which is higher than the zone where the spouted bed 8 is to be formed, and polyolefin particles containing solid particles of an olefin polymerization catalyst are fed to the reaction zone 25. At the same time, a particle discharge tube 35 is connected to the tubular baffle 30, and the polyolefin particles that have grown within the reaction zone 25 are discharged via the particle discharge tube 35. Two valves V71, V72 are installed in series in the particle discharge tube 35, and the polyolefin particle can be discharged in a subsequent process by successively opening and closing the valves.

Accordingly, in the present embodiment, a polymerization step is realized that uses two reactors, namely, the olefin prepolymerization reactor 5 and the olefin polymerization reactor 10A. In this way, the olefin prepolymerization reactor 5 effects the polymerization and growth of polyolefin particles, creating relatively large polyolefin particles having a particle size of preferably at least 500 μm, more preferably at least 700 μm, and even more preferably at least 850 μm, thereby enabling the formation of a more stable spouted bed. However, it is also possible that the polymerization step use a single reactor that has no olefin prepolymerization reactor 5. In this case, an olefin polymerization catalyst or prepolymerization catalyst is fed directly to the olefin polymerization reactor 10A, and olefin polymerization is carried out. Alternatively, one or more additional olefin polymerization reactor, such as the olefin prepolymerization reactor 5 or the olefin polymerization reactor 10A, may be provided subsequent to the olefin polymerization reactor 10A so as to achieve a polymerization step composed of three or more stages.

Olefin, Polyolefin and Catalyst

Next, the olefin, polyolefin, catalyst and other substances used in such a system are described.

In the olefin polymerization reactor, polyolefin production process and polyolefin production system of the invention, polyolefin, i.e., olefin polymer (olefin homopolymer, olefin copolymer), production is carried out by the polymerization of one or more olefins (homopolymerization or copolymerization). Examples of olefins that may be used in this invention include ethylene, propylene, 1-butene, 1-pentene, 4-methyl-1-pentene, 5-methyl-1-hexene, 1-hexene, 1-heptene and 1-octene.

One or more of these olefins may be used. Further, the olefin used may be changed in each polymerization step. In cases where polymerization is carried out as a multistage process, a different olefin may be used in each stage. When two or more olefins are used, examples of suitable olefin combinations that may be employed include propylene/ethylene, propylene/1-butene, propylene/ethylene/1-butene, ethylene/1-butene, ethylene/1-hexene and ethylene/1-octene. In addition to olefins, it is also possible to use at the same time various copolymeric ingredients such as dienes.

Olefin polymers (homopolymers, copolymers) such as propylene homopolymers, propylene/ethylene copolymers, propylene/1-butene copolymers and propylene/ethylene/1-butene copolymers may be advantageously produced in the present invention. The production of olefin polymers obtained by multistage polymerization in which the proportions of the monomer units constituting the polymer ingredients differ in the respective stages is especially preferred. For example, it is possible to form a multistage-polymerized olefin copolymer by feeding one type of olefin to an olefin prepolymerization reactor 5 and an olefin polymerization reactor 10A so as to faun homopolymer particles, or copolymerizing the first olefin with a small amount of another olefin to form random copolymer particles, then feeding, in a subsequent stage, two or more types of olefin to these polymer particles in an additional olefin polymerization reactor such as an olefin prepolymerization reactor 5 or an olefin polymerization reactor 10A. This results in a narrow residence time distribution in the olefin polymerization reactor 10A, making it easy to achieve a fixed compositional ratio within the polymer particles. This approach is especially effective for reducing molding defects.

Examples of such polymers include propylene-propylene/ethylene polymers, propylene-propylene/ethylene-propylene/ethylene polymers, propylene/ethylene-propylene/ethylene polymers and propylene-propylene/ethylene/1-butene polymers. Here, a dash ("-") indicates the boundary between polymers, and a slash ("/") indicates that two or more olefins are copolymerized within the polymer. Of these, the production of multistage-polymerized propylene-based copolymers which are polymers having propylene-based monomer units, are called "high-impact polypropylene" (in Japan, also customarily called "polypropylene block copolymers"), and have crystalline propylene-based polymer segments and amorphous propylene-based polymer segments, is preferred. A multistage polymerized propylene-based copolymer can be prepared by the continuous multistage polymerization, in any order, of crystalline homopolypropylene segments or random copolymer segments obtained by copolymerizing a small amount of an olefin other than propylene, with amorphous rubber segments copolymerized from ethylene, propylene and, as an optional ingredient, an olefin other than ethylene and propylene, in the presence of the respective polymers. Such a copolymer has an intrinsic viscosity, as measured in 1,2,3,4-tetrahydronaphthalene at 135° C., which is preferably in a range of from 0.1 to 100 dl/g. This multistage polymerized polypropylene-based copolymer has excellent heat resistance, rigidity and impact resistance, and can therefore be used in automotive components such as bumpers and door trim, and in various packaging containers such as retortable food packaging containers.

Moreover, in the olefin polymerization reactor and polyolefin production process of the invention, to broaden the molecular weight distribution of the olefin polymer, the olefin polymer components produced in respective polymerization steps may be given different molecular weights. The present invention is also advantageous for producing olefin polymers having a broad molecular weight distribution. For example, the intrinsic viscosity obtained by measurement as described above for the polymer component obtained in the polymerization step that produces the highest molecular weight polymer component is in a range of preferably from 0.5 to 100 dl/g, more preferably from 1 to 50 dl/g, and even more preferably from 2 to 20 dl/g. This intrinsic viscosity is at least five times the intrinsic viscosity of the polymer component obtained in the polymerization step that produces the lowest molecular weight polymer component. The present invention can advantageously produce an olefin polymer in which the amount of the polymer component obtained in the polymerization step which produces the highest molecular weight polymer component accounts for from 0.1 to 80 wt % of the olefin polymer.

The olefin polymerization catalyst used in the invention may be a known addition polymerization catalyst used in olefin polymerization. Illustrative examples include Ziegler-type solid catalysts formed by contacting a solid catalyst component containing titanium, magnesium, a halogen and an electron donor (referred to below as catalyst component "A") with an organoaluminum compound component and an electron donor component; and metallocene-type solid catalysts prepared by supporting a metallocene compound and a cocatalyst component on a granular carrier. Combinations of these catalysts may also be used.

What is commonly referred to as a titanium/magnesium composite catalyst may be used as catalyst component "A" employed in the preparation of a Ziegler-type solid catalyst. This composite catalyst may be obtained by contacting a titanium compound, a magnesium compound and an electron donor such as the following.

Titanium compounds that may be used to prepare the catalyst component "A" are exemplified by titanium compounds having the general formula $Ti(OR^1)_a X_{4-a}$ (where $R^1$ is a hydrocarbon group of 1 to 20 carbons, X is a halogen atom, and the letter a is a number such that $0 \leq a \leq 4$). Illustrative examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or as combinations of two or more thereof.

Magnesium compounds that may be used to prepare catalyst component "A" are exemplified by magnesium compounds which have a magnesium-carbon bond or a magnesium-hydrogen bond and have a reducing ability, and magnesium compounds which lack a reducing ability. Illustrative examples of magnesium compounds which have a reducing ability include dialkylmagnesium compounds such as dimethylmagnesium, diethylmagnesium, dibutylmagnesium and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds having a reducing ability may also be used in the form of a complex compound with an organoaluminum compound.

Illustrative examples of magnesium compounds which lack a reducing ability include dihalogenated magnesium compounds such as magnesium dichloride; alkoxymagnesium halides such as methoxymagnesium chloride, ethoxymagnesium chloride and butoxymagnesium chloride; dialkoxymagnesium compounds such as diethoxymagnesium and dibutoxymagnesium; and magnesium carboxylates such as magnesium laurate and magnesium stearate. These magnesium compounds which lack a reducing ability may be compounds which are synthesized, either in advance or at the time of catalyst component "A" preparation, by a known method from a magnesium compound having a reducing ability.

Electron donors that may be used to prepare catalyst component "A" include oxygen-containing electron donors such as alcohols, phenols, ketones, aldehydes, carboxylic acids, esters of organic or inorganic acids, ethers, acid amides and acid anhydrides; nitrogen-containing electron donors such as ammonia, amines, nitriles and isocyanates; and organic acid halides. Of these electron donors, the use of inorganic acid esters, organic acid esters and ethers is preferred.

Preferred inorganic acid esters include silicon compounds having the general formula $R^2_n Si(OR^3)_{4-n}$ (where $R^2$ is a hydrocarbon group of 1 to 20 carbons or a hydrogen atom, $R^3$ is a hydrocarbon group of 1 to 20 carbons, and the letter n is a number such that $0 \leq n \leq 4$). Illustrative examples include tetraalkoxysilanes such as tetramethoxysilane, tetraethoxysilane and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane and t-butyltriethoxysilane; and dialkyldialkoxysilanes such as dimethyldimethoxysilane, diethyldimethoxsilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane and t-butylmethyldiethoxysilane.

Preferred organic acid esters include monofunctional and polyfunctional carboxylic acid esters, such as aliphatic carboxylic acid esters, alicyclic carboxylic acid esters and aromatic carboxylic acid esters. Illustrative examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate and diisobutyl phthalate. Preferred examples include unsaturated aliphatic carboxylic acid esters such as methacrylic acid esters, and phthalic acid esters such as maleic acid esters. Phthalic acid diesters are more preferred.

Illustrative examples of ethers include dialkyl ethers such as diethyl ether, dibutyl ether, diisobutyl ether, diamyl ether, diisoamyl ether, methyl butyl ether, methyl isoamyl ether and ethyl isobutyl ether. Preferred examples include dibutyl ether and diisoamyl ether.

Illustrative examples of organic acid halides include mono- and polyfunctional carboxylic acid halides, such as aliphatic carboxylic acid halides, alicyclic carboxylic acid halides and aromatic carboxylic acid halides. Illustrative examples include acetyl chloride, propionyl chloride, butyryl chloride, valeroyl chloride, acryloyl chloride, methacryloyl chloride, benzoyl chloride, toluoyl chloride, anisoyl chloride, succinyl chloride, malonyl chloride, maleyl chloride, itaconyl chloride and phthaloyl chloride. Preferred examples include aromatic carboxylic acid chlorides such as benzoyl chloride, toluoyl chloride and phthaloyl chloride. Phthaloyl chloride is especially preferred.

Examples of methods for preparing catalyst component "A" include the following.

(1) Reacting a liquid magnesium compound, or a complex compound of a magnesium compound and an electron donor, with a precipitating agent, then treating with a titanium compound or with a titanium compound and an electron donor.
(2) Treating a solid magnesium compound, or a complex compound of a solid magnesium compound and an electron donor, with a titanium compound or with a titanium compound and an electron donor.
(3) Reacting a liquid magnesium compound with a liquid titanium compound in the presence of an electron donor, and inducing the precipitation of a solid titanium complex.
(4) Further treating the reaction product obtained in method (1), (2) or (3) above with a titanium compound, or with an electron donor and a titanium compound.
(5) A method in which a solid product obtained by reducing an alkoxytitanium compound with an organomagnesium compound such as a Grignard reagent in the presence of an organosilicon compound having a Si—O bond is treated with an ester compound, an ether compound and titanium tetrachloride.
(6) A method in which a solid product obtained by reducing a titanium compound with an organomagnesium compound in the presence of an organosilicon compound or an organosilicon compound and an ester compound is treated by adding, in order, a mixture of an ether compound and titanium tetrachloride, followed by an organic acid halide compound, and the treated solid is subsequently treated with a mixture of an ether compound and titanium tetrachloride or a mixture of an ether compound, titanium tetrachloride and an ester compound.
(7) A method in which the product of the contact catalysis of a metal oxide, dihydrocarvyl magnesium and a halogen-containing alcohol is contacted with an electron donor and a titanium compound, either following treatment with a halogenating agent or without such treatment.
(8) A method in which a magnesium compound such as the magnesium salt of an organic acid or an alkoxymagnesium is contacted with an electron donor and a titanium compound, either following treatment with a halogenating agent or without such treatment.
(9) Treating the compound obtained in any of methods (1) to (8) above with a halogen, a halogen compound or an aromatic hydrocarbon.

Of the above methods for preparing catalyst component "A", methods (1) to (6) are preferred. These methods of preparation are generally all carried out in an inert gas atmosphere, such as nitrogen or argon.

In the preparation of catalyst component "A", the titanium compound, organosilicon compound and ester compound are preferably used after dissolution or dilution in a suitable solvent. Illustrative examples of such solvents include aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran.

In the preparation of catalyst component "A", the temperature of the reducing reaction which uses an organomagnesium compound is generally from −50 to +70° C. From the standpoint of catalyst activity and cost, the temperature is preferably from −30 to +50° C., and more preferably from −25 to +35° C. The dropwise addition time for the organomagnesium compound, while not subject to any particular limitation, is generally from about 30 minutes to about 12 hours. Following completion of the reducing reaction, subsequent reactions may be carried out at a temperature of from 20 to 120° C.

In the preparation of catalyst component "A", the reducing reaction may be carried out in the presence of a porous material such as an inorganic oxide or an organic polymer so as to allow the solid product to be impregnated into the porous material. Such porous materials preferably have a pore volume at a pore radius of from 20 to 200 nm of at least 0.3 ml/g and an average particle size of from 5 to 300 μm. Examples of porous inorganic oxides include $SiO_2$, $Al_2O_3$, MgO, $TiO_2$, $ZrO_2$ and composite oxides thereof. Examples of porous polymers include polystyrene-based porous polymers such as polystyrene and styrene-divinylbenzene copolymers; polyacrylate ester-based porous polymers such as polyethyl acrylate, methyl acrylate-divinyl benzene copolymers, polymethyl methacrylate and methyl methacrylate-divinylbenzene copolymers; and polyolefin-based porous polymers such as polyethylene, ethylene-methyl acrylate copolymers and polypropylene. Of these porous substances, $SiO_2$, $Al_2O_3$ and styrene-divinylbenzene copolymers are preferred.

The organoaluminum compound component used in the preparation of a Ziegler solid catalyst has at least one aluminum-carbon bond on the molecule and may typically have one of the following general formulas.

$$R^4_m AlY_{3-m}$$

$$R^5R^6Al-O-AlR^7R^8$$

In the above formulas, $R^4$ to $R^8$ are each hydrocarbon groups having from 1 to 8 carbons, and Y is a halogen atom, hydrogen or an alkoxy group. $R^4$ to $R^8$ may each be the same or different. Also, the letter m is a number such that $2 \leq m \leq 3$.

Illustrative examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of a trialkylaluminum with a dialkylaluminum halide, such as a mixture of triethylaluminum with diethylaluminum chloride; and alkylalumoxanes such as tetraethyldialumoxane and tetrabutyldialumoxane. Of these organoaluminum compounds, the use of a trialkylaluminum, a mixture of a trialkylaluminum with a dialkylaluminum halide, or an alkylalumoxane is preferred. The use of triethylaluminum, triisobutylaluminum, a mixture of triethylaluminum and diethylaluminum chloride, or tetraethyldialumoxane is more preferred.

Examples of the electron donor component used in the preparation of a Ziegler solid catalyst include the following commonly used electron donors: oxygen-containing electron donors such as alcohols, phenols, ketones, aldehydes, carboxylic acids, the esters of organic or inorganic acids, ethers, acid amides and acid anhydrides; and nitrogen-containing electron donors such as ammonia, amines, nitriles and isocyanates. Of these electron donor components, inorganic acid esters and ethers are preferred.

Preferred inorganic acid esters include silicon compounds of the general formula $R^9_n Si(OR^{10})_{4-n}$ (where $R^9$ is a hydrocarbon group of 1 to 20 carbons or a hydrogen atom, $R^{10}$ is a hydrocarbon group of 1 to 20 carbons, and the letter n is such that $0 \leq n \leq 4$). Illustrative examples include tetrabutoxysilane, butyltrimethoxysilane, tert-butyl-n-propyldimethoxysilane, dicyclopentyldimethoxysilane and cyclohexylethyldimethoxysilane.

Preferred ethers include dialkyl ethers, and diether compounds of the general formula

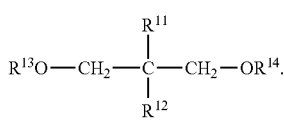

In the above formula, $R^{11}$ to $R^{14}$ are each independently a linear or branched alkyl, alicyclic hydrocarbon, aryl or aralkyl group of 1 to 20 carbons, although $R^{11}$ or $R^{12}$ may be a hydrogen atom. Illustrative examples include dibutyl ether, diamyl ether, 2,2-diisobutyl-1,3-dimethoxypropane and 2,2-dicyclopentyl-1,3-dimethoxypropane.

Of these electron donor components, an organosilicon compound of the general formula $R^{15}R^{16}Si(OR^{17})_2$ is especially preferred. In this formula, $R^{15}$ is a hydrocarbon group of 3 to 20 carbons in which the carbon atoms neighboring the silicon are secondary or tertiary. Illustrative examples include branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. In this formula, $R^{16}$ is a hydrocarbon group of 1 to 20 carbons, illustrative examples of which include straight chain alkyl groups such as methyl, ethyl, propyl, butyl and pentyl; branched alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. Also, in the above formula, $R^{17}$ is a hydrocarbon group of 1 to 20 carbons, and is preferably a hydrocarbon group of 1 to 5 carbons. Illustrative examples of organosilicon compounds that may be used as such electron donor components include tert-butyl-n-propyldimethoxysilane, dicyclopentyldimethoxysilane and cyclohexylethyldimethoxysilane.

In the preparation of a Ziegler solid catalyst, the organoaluminum compound component is used in an amount, per mole of titanium atoms in catalyst component "A", of generally from 1 to 1,000 moles, and preferably from 5 to 800 moles. The electron donor component is used in an amount, per mole of titanium atoms in catalyst component "A", of generally from 0.1 to 2,000 moles, preferably from 0.3 to 1,000 moles, and more preferably from 0.5 to 800 moles.

Catalyst component "A", the organoaluminum compound component and the electron donor component may be brought into mutual contact before being fed to the multistage polymerization reactor, or may be separately fed to the multistage polymerization reactor, then contacted within the reactor. Alternatively, any two of these components may first be contacted with each other, and the remaining component subsequently brought into contact, or the respective components may be brought into mutual contact in a plurality of divided portions.

Examples of metallocene compounds that may be used to prepare the metallocene-type solid catalyst include transition metal compounds of the following general formula.

$L_xM$

In the formula, M is a transition metal, x is a number which satisfies the atomic valence of the transition metal M, and L is a ligand coordinated to the transition metal. At least one occurrence of L is a ligand having a cyclopentadienyl skeleton.

The transition metal M is preferably an atom from groups 3 to 6 of the Periodic Table of the Elements (IUPAC, 1989), and more preferably titanium, zirconium or hafnium.

Ligands L having a cyclopentadienyl skeleton are exemplified by (substituted) cyclopentadienyl groups, (substituted) indenyl groups and (substituted) fluorenyl groups. Illustrative examples include cyclopentadienyl, methylcyclopentadienyl, tert-butylcyclopentadienyl, dimethylcyclopentadienyl, tert-butyl-methylcyclopentadienyl, methyl-isopropylcyclopentadienyl, trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethylndeyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, 2,7-di-tert-butylfluorenyl and substituted versions of the above. In cases where there is a plurality of ligands having a cyclopentadienyl skeleton, these ligands may be mutually like or unlike.

Ligands L other than those having a cyclopentadienyl skeleton are exemplified by heteroatom-bearing groups, halogen atoms and hydrocarbon groups (excluding groups having a cyclopentadiene-type anion skeleton).

Examples of the heteroatom in the heteroatom-bearing group include oxygen, sulfur, nitrogen and phosphorus atoms. Such groups are exemplified by alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having on the ring at least one atom selected from among oxygen, sulfur, nitrogen and phosphorus atoms. Illustrative examples of the halogen atoms include fluorine, chlorine, bromine and iodine atoms. The hydrocarbon groups are exemplified by alkyl, aralkyl, aryl and alkenyl groups.

Two or more ligands L may be directly linked to each other or may be linked through a residue containing at least one type of atom selected from among carbon, silicon, nitrogen, oxygen, sulfur and phosphorus atoms. Illustrative examples of such residues include alkylene groups such as methylene, ethylene and propylene; substituted alkylene groups such as dimethylmethylene (isopropylidene) and diphenylmethylene; silylene groups; substituted silylene groups such as dimethylsilylene, diethylsilylene, diphenylsilylene, tetramethyldisilylene and dimethoxysilylene; and heteroatoms such as nitrogen, oxygen, sulfur and phosphorus. Of these, methylene, ethylene, dimethylmethylene (isopropylidene), diphenylmethylene, dimethylsilylene, diethylsilylene, diphenylsilylene and dimethoxysilylene are especially preferred.

Illustrative examples of metallocene compounds include bis(cyclopentadienyl)zirconium dichloride, bis(methylcyclopentadienyl)zirconium dichloride, bis(indenyl)zirconium dichloride, bis (4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl) (3,5-di-tert-butyl-2-phenoxy) titanium dichloride. Additional examples include compounds in which the dichloride has been substituted with dimethoxide or diphenoxide groups.

Cocatalyst components that may be used in the preparation of metallocene-type solid catalysts include organoaluminumoxy compounds, organoaluminum compounds and boron compounds.

Illustrative examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane and hexylaluminoxane.

Illustrative examples of organoaluminum compounds include trimethylaluminum, triethylaluminum, tri-n-butylaluminum, triisobutylaluminum and tri-n-hexylaluminum.

Illustrative examples of boron compounds include tris(pentafluorophenyl)borane, triphenylcarbenium tetrakis(pentafluorophenyl) borate, tri(n-butyl)ammonium tetrakis(pentafluorophenyl) borate and N,N-dimethylanilinium tetrakis(pentafluorophenyl) borate.

The granular carrier that may be used in the preparation of metallocene solid catalysts is preferably a porous substance, illustrative examples of which include inorganic oxides such as $SiO_2$, $Al_2O_3$, MgO, $ZrO_2$, $TiO_2$, $B_2O_3$, CaO, ZnO, BaO and $ThO_2$; clays or clayey minerals such as smectite, montmorillonite, hectorite, laponite and saponite; and organic polymers such as polyethylene, polypropylene and styrene-divinyl benzene copolymer.

Metallocene-type solid catalysts that may be used include those mentioned in, for example, Japanese Patent Application Laid-open No. S60-35006, Japanese Patent Application Laid-open No. S60-35007, Japanese Patent Application Laid-open No. S60-35008, Japanese Patent Application Laid-open No. S61-108610, Japanese Patent Application Laid-open No. S61-276805, Japanese Patent Application Laid-open No. S61-296008, Japanese Patent Application Laid-open No. S63-89505, Japanese Patent Application Laid-open No. H3-234709, Japanese Translation of PCT Application No. H5-502906, Japanese Patent Application Laid-open No. H6-336502 and Japanese Patent Application Laid-open No. H7-224106.

When a metallocene-type solid catalyst is used in olefin polymerization, a cocatalyst component such as an organoaluminum compound or a boron compound may be used together if necessary. In such cases, the metallocene-type solid catalyst and the cocatalyst component may be brought into mutual contact prior to being fed into the polymerization reactor, or may be separately fed into the polymerization reactor and contacted within the reactor. Alternatively, the respective components may be brought into mutual contact in a plurality of divided portions.

The mass mean particle diameter of the above olefin polymerization catalyst is generally from 5 to 150 µm. In a gas phase polymerization reactor in particular, to suppress the scattering of particles to the reactor exterior, it is desirable to use a catalyst having a mass mean particle diameter of preferably at least 10 µm, and more preferably at least 15 µm. The polymerization catalyst in the present embodiment may include additives such as a fluidization aid and an antistatic additive. Together with the polymerization catalyst of the present embodiment, concomitant use may also be made of a chain transfer agent such as hydrogen for the purpose of regulating the molecular weight of the polymer.

The olefin polymerization catalyst may be a so-called prepolymerization catalyst which first induces polymerization in a small amount of olefin. Examples of olefins that may be used in prepolymerization include the olefins that may be used in the above-described polymerization. In this case, a single type of olefin may be used alone, or two or more different olefins may be used together.

Methods for producing the prepolymerization catalyst include, but are not limited to, slurry polymerization and gas phase polymerization. Of these, slurry polymerization is preferred. The use thereof in production is sometimes economically advantageous. Production may be carried out using a batch system, a semibatch-type system or a continuous system.

The mass mean particle diameter of the prepolymerization catalyst is generally from 5 to 1,000 µm. In a gas phase polymerization reactor in particular, to minimize scatter to the exterior of the reactor, the mass mean particle diameter is preferably at least 10 µm, and more preferably at least 15 µm. Moreover, it is desirable for the amount of prepolymerization catalyst having a particle diameter of not more than 20 µm, and especially not more than 10 µm, to be low.

The polymerization catalyst may be introduced into the reactor as a suspension in a hydrocarbon solvent or the like. Introduction by entrainment with monomer gas or an inert gas such as nitrogen is also possible.

Polyolefin Production Process

Next, the process of producing a polyolefin by using such a system is described. First, polyolefin particles containing a catalyst component having polymerization activity are formed in the olefin prepolymerization reactor 5 by using an olefin polymerization catalyst obtained by a known method.

Meanwhile, an olefin-containing gas is fed via the line L30 into the cylinder 12A in the olefin polymerization reactor 10A, the pressure is raised to the polymerization pressure, and the interior of the cylinder 12A is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. By contrast, at a reaction pressure above 10 MPaG, equipment costs for the reactor may become high. The polymerization temperature varies according to the type of monomer, the molecular weight of the product and other factors, although a temperature equal to or below the melting point of the olefin polymer, and preferably at least 10° C. lower than the melting point, is desirable. Specifically, the temperature is preferably from 0 to 120° C., more preferably from 20 to 100° C., and even more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed to the cylinder 12A through a feed line L6 connected to the line L5. The polyolefin particles fed into the cylinder 12A are most often particles which do not contain a catalyst component having a polymerization activity, although the presence within the particles of a catalyst component having a polymerization activity is acceptable.

When polyolefin particles are fed into the cylinder 12A through the feed line L6, while feeding an olefin-containing gas into the reaction zone 25 through the line L30, as shown in FIG. 1, a spouted bed 8 of polyolefin particles is formed within the reaction zone 25. That is, under the action of the gas from the gas inlet orifice, the particle concentration thins near the center axis of the cylinder 12A in the reaction zone 25 and the spout portion 8a is formed in which particles flow upward together with the gas. Meanwhile, an annular particle bed 8b of particles falling in the manner of a moving bed under the influence of gravity is formed at the periphery of the spout bed, giving rise to the circulatory movement of particles within the reaction zone 25.

The polyolefin particles containing a catalyst component having a polymerization activity that were formed in the olefin prepolymerization reactor 5 at a stage at which the spouted bed 8 has been formed within the reaction zone 25 are fed from the line L5 into the cylinder 12A at a constant rate per unit time, thereby commencing steady-state operation of the olefin polymerization reactor 10A.

Meanwhile, part of the olefin monomer-containing gas forms the spout portion 8a and sweeps past the particle bed, while the remainder of the gas diffuses into the annular particle bed 8b. In this way, the olefin-containing gas and the polyolefin particles including the catalyst component having a polymerization activity undergo solid-gas contact and the action of the catalyst within the polyolefin particles causes the olefin polymerization reaction to proceed, resulting in growth of the polyolefin particles. The polyolefin particles that have grown within the reaction zone 25 are discharged from the particle discharge tube 35.

For the stable spouted bed 8 to form in the reaction zone 25, it is preferable that the following operating condition be satisfied; i.e., that the gas superficial velocity $U_o$ be equal to or greater than the minimum gas superficial velocity Urns at which a spouted bed is capable of forming. In addition to the physical properties of the powder and gases being handled, the minimum gas superficial velocity Urns is also influenced by the shape of the polymerization reactor. Various formulas have been proposed for calculating the minimum gas superficial velocity Urns. One example is formula (1) below.

$$U_{ms} = \frac{d_P}{d_B}\left(\frac{d_A}{d_B}\right)^{1/3} \sqrt{\frac{2gL_S(\rho_S - \rho_G)}{\rho_G}} \times \left(\frac{\rho_G}{\rho_{AIR}}\right)^{0.2} \quad (1)$$

In this formula, $d_P$ is the particle diameter, $\rho_S$ is the particle density, $\rho_G$ is the gas density under the pressure and temperature conditions of the reaction zone, $\rho_{AIR}$ is the density of air under room temperature conditions, and $L_S$ is the height of the spouted bed.

The spouted bed height $L_S$ within the reaction zone 25 is equal to or less than the maximum spouted bed height $Ls_{MAX}$ at which a spouted bed is capable of forming, and is not subject to any particular limitation, provided it is equal to or less than the maximum spouted bed height $Ls_{MAX}$. Various formulas for calculating the maximum spouted bed height $Ls_{MAX}$ have been proposed, one of which is formula (2) below.

$$\frac{Ls_{MAX}}{d_B} = \frac{d_B}{d_A}\left\{0.218 + \frac{0.005(\rho_S - \rho_G)gd_A}{\rho_G u_t u_{mf}}\right\} \quad (2)$$

In this formula, $u_t$ is the terminal velocity of the particles, and $u_{mf}$ is the minimum fluidization velocity.

From the standpoint of volume efficiency and enabling the formation of a more stable spouted bed, it is preferable for the spouted bed height $L_s$ to be higher than the tubular baffle 30.

With the olefin polymerization reactor 10A according to the present embodiment, the following effects are demonstrated. Thus, since the olefin-containing gas is fed to the annular particle bed 8b through a plurality of through holes 30b, sufficient fluidization can be attained at a small gas feed amount even with comparatively large particles. At the same time, the solid-gas contact efficiency in the annular particle bed 8b is increased. In addition, since the gas within the reaction zone 25 can be discharged from the gas discharge nozzle 70 provided sidewise, the amount of gas diffusing to the annular particle bed 8b of the spouted bed 8 can be increased and a sufficiently high solid-gas contact efficiency of the particles and olefin-containing gas can be obtained. As a result, polyolefin particles can be grown efficiently.

Further, the particle residence time distribution in the spouted bed formed within the cylinder 12A of the olefin polymerization reactor 10A can be narrowed by comparison with that in the fluidized bed. Therefore, in the continuous production of olefin polymer, it is possible to produce olefin polymer having an excellent structural uniformity, for example, by conducting polymerization in multistage arrangement of olefin polymerization reactors 10A. Moreover, when the production conditions are to be changed, because polyolefin particles polymerized prior to the change in conditions can be easily discharged from the reactor, the amount of off-specification product that arises as a result can be cut to a sufficient degree. Also, by providing deflectors 20 to suppress the scattering of spouted particles, the freeboard zones can be shortened, enabling a high volume efficiency to be achieved.

Second Embodiment

Figure 3:
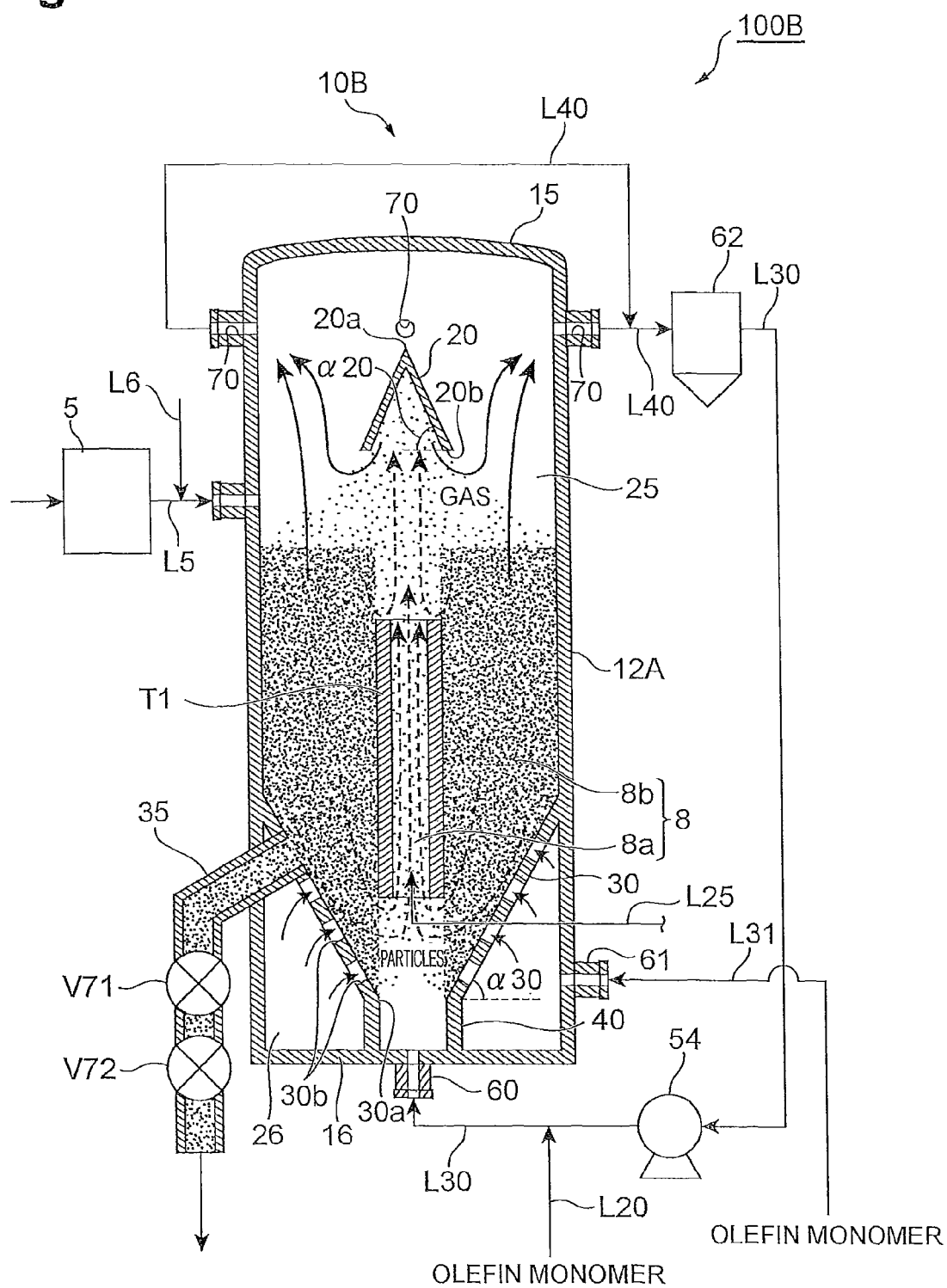
FIG. 3 is a schematic structural view of another embodiment of the polyolefin production system according to the present invention.

A production system 100B shown in FIG. 3 has an olefin prepolymerization reactor 5 and an olefin polymerization reactor 10B. The olefin polymerization reactor 10B differs from the above-described reactor 10A in having a draft tube T1 disposed within the reaction zone 25. By using the draft tube T1, it is possible to form within the reaction zone 25 a spouted bed that has excellent stability and can further reduce the pressure loss.

The reactor 10B uses the draft tube T1 disposed within the reaction zone 25, enabling to obtain the gas composition within the draft tube T1 that is different from the gas composition outside the draft tube T1. The reactor 10B is equipped with a pipe L25 communicating with the inside of the draft tube T1, and a gas or a liquid is fed into the draft tube T1 through this pipe. For example, by obtaining a gas composition inside the draft tube T1 that has a hydrogen content lower than that in the gas composition outside the draft tube, it is possible to produce a polymer with a comparatively high molecular weight within the draft tube T1. By repeatedly passing the particles through zones with different gas compositions to cause the particles to grow gradually, it is possible to control the molecular weight distribution of the polymer and produce particles having an excellent structural uniformity.

Third Embodiment

Figure 4:
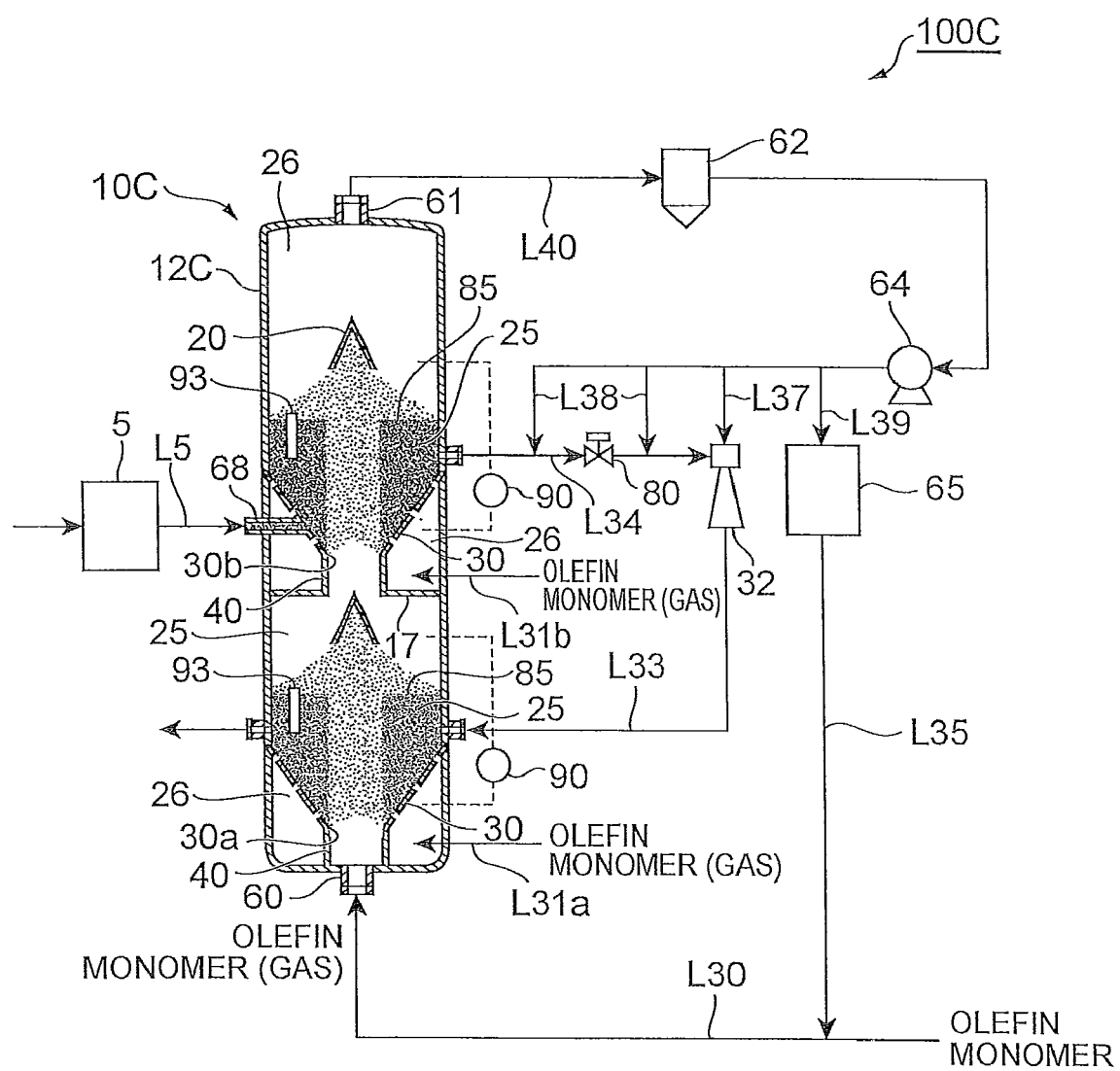
FIG. 4 is a schematic structural view of another embodiment of the polyolefin production system according to the present invention.

A preferred arrangement of the polyolefin production system which employs a bulk polymerization reactor as the olefin prepolymerization reactor and employs an ejector system as the transferring means is described in detail while referring to FIG. 4. The polyolefin production system 100C shown in FIG. 4 includes a bulk polymerization reactor 5 and an olefin polymerization reaction 10C having at the interior both top and bottom reaction zones 25.

The bulk polymerization reactor 5 polymerizes an olefin in a liquid phase containing an olefin polymerization catalyst, thereby forming polyolefin particles. The polyolefin particles formed in the bulk polymerization reactor 5 pass together with liquid olefin through a line L5, and are fed to the olefin polymerization reactor 10C. A nozzle 68 for feeding a slurry to the top reaction zone 25 is provided, as shown in FIG. 4, at a position lower than the powder level 85 of the spouted bed. When the slurry is fed into the reaction zone 25 from a position lower than the powder level 85, it is preferable to regulate the slurry feed rate so that the superficial velocity, following gasification, of the liquid olefin within the slurry does not exceed the minimum fluidization rate ($U_{mf}$) of the polyolefin particles held within the reaction zone 25. By regulating the slurry feed rate in this way, it is possible to fully prevent the flow state of the spouted bed from becoming unstable with gasification of the liquid olefin inside the reaction zone 25. The "superficial velocity of the liquid olefin following gasification" as referred to herein is the value obtained by converting the volumetric flow rate of the liquid olefin fed to the olefin polymerization reactor to the volumetric flow rate following gasification, and dividing the latter by the cross-sectional area A of the olefin polymerization reactor cylinder ($A=\pi D^2/4$, where $D_R$ is the inside diameter of the cylinder).

In the arrangement just described, the slurry is fed from a position lower than the powder level 85. However, the slurry feeding position is not limited to such a position. For example, the nozzle 68 may be provided at a position higher than the powder level 85. This has the advantage that, even when the amount of slurry fed per unit time is made relatively high, the flow state of the spouted bed can be kept from becoming unstable with the gasification of the liquid olefin.

As shown in FIG. 4, a gas feeding nozzle 60 provided in the bottom of the cylinder 12C feeds an olefin monomer to the bottom of the cylinder 12C via a line L30. A gas discharge nozzle 71 is provided at the top of the cylinder 12C. Gases that have risen through the cylinder 12C are discharged to the exterior via a line L40, and gas-entrained particles are discharged by a cyclone 62 that is optionally provided. The gases pass through a compressor 64 and a heat exchanger 65, then are introduced to a line L30 via a line L35 and recycled.

The inside of the cylinder 12C is partitioned into a top stage and a lower stage by a partition plate 17, and the top stage and bottom stage are further each partitioned by the tubular baffle 30 into a reaction zone 25 and a bottom zone 26. Gases that have passed through the bottom reaction zone 25 pass through an upper extension tube 40 and flow into the upper reaction zone 25. Meanwhile, gases that have been introduced into the bottom zone 26 of the bottom stage and top stage through lines L31a, L31b flow into the reaction zone 25 through the through holes provided in the tubular baffle 30.

As described above, the olefin polymerization reactor 10C is equipped with an ejector system as the transferring means. This transferring means includes a particle removing line L34 which removes polyolefin particles from the upper reaction zone 25, an ejector 32 provided at a front end of the particle removing line L34, and a particle feeding line L33 which feeds polyolefin particles from the ejector 32 to the bottom reaction zone 25. An on-off valve 80 is provided in the particle removing line L34. A line 38 is connected to the particle removing line L34 on the upstream side and the downstream side of this on-off valve 80, enabling a gas for preventing clogging to be fed into the particle removing line L34 via the gas feeding lines L38.

Part of the gas that has been pressurized by the compressor 64 is fed through a line L37 to the ejector 32. This gas is used for ejector operation. In addition, part of the gas pressurized by the compressor 64 is fed through the line L38 to the particle removing line L34 on the upstream and downstream sides of the on-off valve 80. This gas is used to prevent clogging of the on-off valve 80 and the ejector 32.

The flow rate of the ejector operating gas is not subject to any particular limitation, provided it is equal to or higher than an amount which is capable of discharging the polyolefin particles. The amount of gas used to prevent clogging is preferably about 10 parts by volume per 100 parts by volume of the gas for operating the ejector. To reliably prevent clogging of the on-off valve 80 and the ejector 32, it is preferable for the gas to be fed constantly through the line L38 to the upstream and downstream sides of the on-off valve 80 during operation of the olefin polymerization reactor 10C, regardless of the open or closed state of the on-off valve 80.

The olefin polymerization reactor 10C has a capacitance type level gauge 93 and a differential pressure gauge 90 for measuring the height of the spouted bed (the position of the powder level 85). The use of both the capacitance type level gauge 93 and the differential pressure gauge 90 enables displacements in the powder levels 85 to be more accurately understood. To prevent clogging of the connection lines for the differential pressure gauge 90, it is preferable to carry out line blowing constantly or periodically.

FIG. 4 illustrates an example in which polyolefin particles are transferred from the top stage to the bottom stage, but by regulating the differential pressure crated by the ejector, it is possible to transfer the particles from the bottom stage to the upper stage, that is, in the direction opposite that shown in the example. In this case, the upper reaction zone is allocated to the bottom stage, and the bottom reaction zone is allocated to the top stage.

Fourth Embodiment

Figure 5:
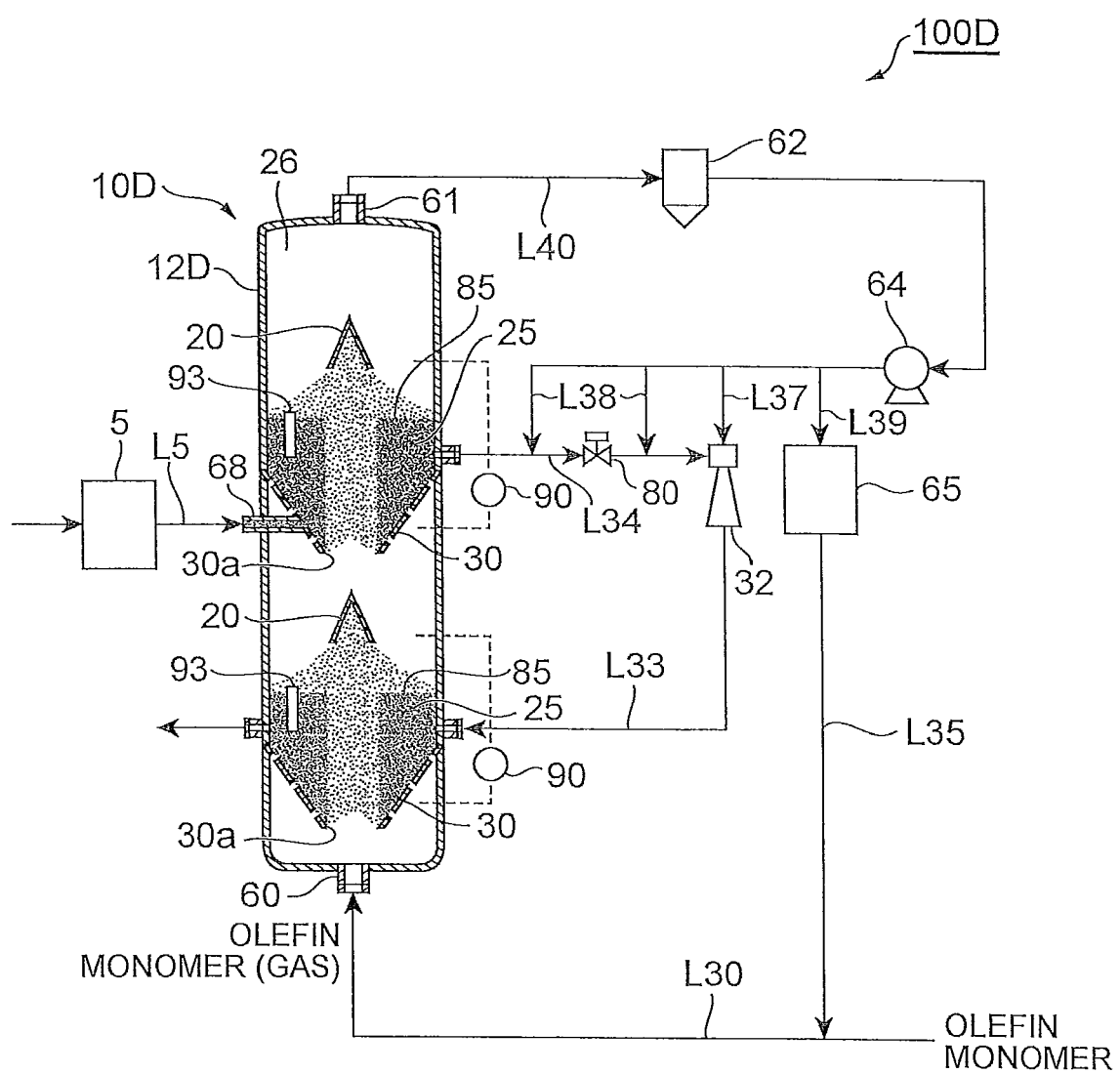
FIG. 5 is a schematic structural view of another embodiment of the polyolefin production system according to the present invention.

A production system 100D shown in FIG. 5 includes an olefin prepolymerization reactor 5 and an olefin polymerization reactor 10D. The olefin polymerization reactor 10D is used when particles are handled that can easily foam a stable spouted bed and differs from the above-described reactor 10A in that the partition plate 17, extension tube 40, and lines L31a, L31b are not provided within a cylinder 12D.

The preferred embodiments of the present embodiment are described in detail above, but the present invention is not limited to the above-described embodiment. For example, in the olefin polymerization reactors of the above-described embodiment, a single spouted bed is formed or two fluidized bed are formed in the vertical direction, but three or more fluidized beds may be also formed in the vertical direction. In order to realize a sufficient plug flow, it is preferred that the number of spouted beds be at least 3, more preferably at least 6. Further, in the olefin polymerization reactor, a plurality of spouted beds may be formed side by side. The particle transfer means is not limited to the ejector system and may use a downcomer or the like.

The second embodiment exemplifies the case of using the draft tube T1 (see (a) of FIG. 6) composed of a straight tube, but a draft tube of the following configuration may be also used. For example, a draft tube T2 shown in (b) of FIG. 6 has a straight tube section T2a of a constant diameter that extends downward from a top end orifice and an increasing diameter section T2b that has a diameter increasing progressively downward from an edge of the straight tube section T2a. Further, the draft tube may have a tapered shape like that of a draft tube T3 shown in (a) of FIG. 7, or may have, as is a case of a draft tube T4 shown in (b) of FIG. 7, an increasing diameter section T4a that has a diameter increasing progressively downward from the top end and a straight tube section T4b of a constant diameter that extends downward from an edge of the increasing diameter section T4a.

By selecting and using the draft tubes configured as shown in FIGS. 6 and 7, it is possible to improve stability of the spouted bed and gas diffusion to the annulus. Further, a plurality of through holes passing from the inside the outside of the draft tube may be provided to increase further the gas diffusion ability. When a plurality of through holes are provided in the draft tube, they may be provided in the entire tube or only in the increasing diameter sections T2*b*, T4*a*.

The first and second embodiments exemplify the case in which the extension tube 40 is provided that extends downward from an edge of the tubular baffle 30, but from the standpoint of further increasing the spouted bed stability, it is preferred that the gas inlet portion have the following configuration. For example, a partition wall may be provided inside the extension tube 40 to extend in the longitudinal direction of the extension tube 40 and partition the conduit 40*a* in the horizontal direction. Specific modes of such an extension tube are shown in (a) to (c) of FIG. 8. Thus, (a) to (c) of FIG. 8 are respective cross-sectional views perpendicular to the longitudinal direction of the extension tube. A partition wall 40*b* of an extension tube 41 shown in (a) of FIG. 8 has a grating structure. A partition wall 40*c* of an extension tube 42 shown in (b) of FIG. 8 has a honeycomb structure. A partition wall 40*d* of an extension tube 43 shown in (c) of FIG. 8 has a structure constituted by circles that are in contact with each other. The extension tube 43 is configured by arranging a plurality of cylindrical pipes parallel to each other inside the tube conduit. The advantage of such a configuration over other configurations is that it is easy to produce.

The partition wall provided in the conduit of the extension pipe is not limited to the configurations shown in (a) to (c) of FIG. 8 and may be configured, for example, as shown in FIGS. 9 and 10. Partition walls 40*b* and 40*c* shown in (a) and (b) of FIG. 9 are formed such that an orifice is formed in the center of the extension tube. In extension tubes 44 and 45 shown in (a) and (b) of FIG. 10, one or two cylindrical members are disposed coaxially in the conduit thereby forming partition walls 40*e* and 40*f*.

Instead of providing a partition wall in the conduit 40*a* of the extension tube 40, it is possible, as shown in FIG. 11, to form a gas inlet portion by disposing a cylindrical member 46 having the top end thereof closed coaxially in the conduit 40*a*. By disposing the cylindrical member 46 in the conduit 40*a*, an annulus 46*a* is formed by an outside surface of the cylindrical member 46 and an inside surface of the extension tube 40. Such a configuration makes it possible to obtain the conduit 40*a* with a ring-shaped cross-section in the horizontal direction. As a result, the lifting effect produced on particles that tend to flow downward from the gas inlet orifice is increased and the number of falling particles can be further reduced by comparison with the case of using a conduit having a round cross section of the same area as the annulus 46*a*. From the standpoint of inhibiting the turbulence of gas flow, it is preferred that, as shown in FIG. 11, the upper side of the cylindrical member 46 has a tapered shape. At least one end of the cylindrical member 46 may be closed and a member with closed bottom end or both ends may be used.

The gas inlet portion may have a configuration such as shown in FIG. 12. The extension tube 40 shown in FIG. 12 has a closure plate 47 that closes the bottom end of the extension tube and a gas inlet pipe 48 that has a conduit 48*a* smaller than the conduit 40*a* and is provided so that the closed plate 47 passes therethrough. A conical baffle (second conical baffle) 23 is installed directly above the top end of the gas inlet pipe 48. The conical baffle 23 has an outside diameter that increases progressively downward, is closed at a top end thereof, and has a bottom end which is spaced apart from an inside wall of the extension tube 40. Since such a configuration is used, the conical baffle 23 acts as a plate that prevents the particles from falling. Therefore, the particles can be sufficiently prevented from falling through the gas inlet orifice even when the supply of gas is stopped. Further, from the standpoint of further stabilizing the fluidized state of the spout bed, it is preferred, as shown in FIG. 13, that the conical baffle 23 have a tubular portion 23*c* extending downward from a peripheral edge of the bottom end of the conical baffle.

Further, the bottom end portions of the extension tubes 40 to 45 may have a bell mouth shape. FIG. 14 shows an extension tube 49 provided with a bottom end portion 40*g* having a bell mouth shape. By using the extension tube having the above-described partition wall, annulus and/or bottom end of a bell mouth shape, it is possible to increase the lifting effect produced on particles that tend to fall downward from the gas inlet orifice of the tubular baffle 30 and reduce further the number of falling particles.

Suitable configurations of the draft tube and the gas inlet portion can be used in appropriate combinations corresponding to properties (mean particle diameter, specific gravity, shape, etc.) of particles that will be brought into contact with gas and reaction conditions (temperature, pressure, gas feed amount, etc.).

What is claimed is:

1. An olefin polymerization reactor of spouted-fluidized bed-type, comprising:
   a vertically extending cylinder;
   a decreasing diameter portion on the cylinder, having an inside diameter that decreases progressively downward, and having a gas inlet orifice at a bottom end thereof; and
   a plurality of through holes passing through from an outside surface towards an inside surface of the decreasing diameter portion,
   wherein a reaction is conducted inside a reaction zone enclosed by the inside surface of the decreasing diameter portion and an inside surface above the decreasing diameter portion of the cylinder.

2. The olefin polymerization reactor according to claim 1, further comprising a draft tube provided inside the cylinder and extending upward from a position spaced apart from the gas inlet orifice.

3. The olefin polymerization reactor according to claim 1 or 2, further comprising, within the reaction zone, a first conical baffle disposed at a position above the gas inlet orifice, and which has an outside diameter that increases progressively downward, and is closed at a top end thereof, and a bottom end of which is spaced apart from an inside wall of the cylinder.

4. The olefin polymerization reactor according to claim 1 or 2, having a plurality of the reaction zones, wherein polyolefin particles pass sequentially through the reaction zones.

5. The olefin polymerization reactor according to claim 4, wherein the plurality of reaction zones are each formed in a vertical row and the polyolefin particles pass sequentially from an upper reaction zone to a lower reaction zone.

6. The olefin polymerization reactor according to claim 4, wherein the plurality of reaction zones are each formed in a vertical row and the polyolefin particles pass sequentially from a lower reaction zone to an upper reaction zone.

7. The olefin polymerization reactor according to claim 4, further comprising means for transferring the polyolefin particles from the reaction zone on an upstream side to the reaction zone on a downstream side.

8. The olefin polymerization reactor according to claim 4, further comprising means for transferring the polyolefin particles from the reaction zone on the upstream side to the reaction zone on the downstream side, wherein the transferring means has a particle removing line for removing the polyolefin particles from the upstream-side reaction zone, an ejector provided on the particle removing line, and a particle feeding line for feeding the polyolefin particles from the ejector to the downstream-side reaction zone.

9. The olefin polymerization reactor according to claim 1 or 2, wherein the ratio $D_O/D_R$ between the orifice diameter $D_O$ of the gas inlet orifice and the cylinder inside diameter $D_R$ is 0.35 or less.

10. The olefin polymerization reactor according to claim 1 or 2, further comprising a tubular portion extending downward from an edge of the gas inlet orifice of the decreasing diameter portion.

11. The olefin polymerization reactor according to claim 10, wherein the tubular portion further has a partition wall that partitions a conduit of the tubular portion in a horizontal direction.

12. The olefin polymerization reactor according to claim 10, further comprising a cylindrical member closed at least one end thereof and installed inside the tubular portion, and the conduit before reaching the gas inlet orifice has an annulus formed by an outside surface of the cylindrical member and an inside surface of the tubular portion.

13. The olefin polymerization reactor according to claim 10, further comprising a closure plate that closes a bottom end of the tubular portion, a gas inlet pipe that has a conduit smaller than the tubular member conduit and is provided so as to pass through the closure plate, and a second conical baffle that has an outside diameter that increases progressively downward, and is closed at a top end thereof, and a bottom end of which is spaced apart from an inside surface of the tubular portion, wherein the second conical baffle is installed directly above the top end of the gas inlet pipe.

14. The olefin polymerization reactor according to claim 13, wherein the second conical baffle has a tubular portion extending downward from a peripheral edge of the bottom end of the second conical baffle.

15. The olefin polymerization reactor according to claim 2, further comprising a pipe that communicates with the inside of the draft tube and feeds a gas or liquid into the draft tube.

16. A polyolefin production process comprising the step of: carrying out olefin polymerization by using the olefin polymerization reactor according to claim 1 or 2.

17. A polyolefin production process comprising the step of: carrying out olefin polymerization by using the olefin polymerization reactor according to claim 1 or 2, wherein a spouted bed of polyolefin particles is formed within the reaction zone by controlling an amount of an olefin-containing gas fed into the reaction zone so that an amount of the olefin-containing gas flowing around a spout portion formed in a center of the reaction zone is less than a minimum fluidization velocity.

18. A polyolefin production process comprising the step of: carrying out olefin polymerization by using the olefin polymerization reactor according to claim 15, wherein compositions of gases present inside and outside a draft tube within a reaction zone are made to differ from each other by feeding a gas and/or liquid into the draft tube through a pipe.

19. A polyolefin production process comprising the step of: carrying out olefin polymerization by using the olefin polymerization reactor according to claim 15, wherein a spouted bed of polyolefin particles is formed within the reaction zone by controlling an amount of an olefin-containing gas fed into the reaction zone so that an amount of the olefin-containing gas flowing around a spout portion formed in a center of the reaction zone is less than a minimum fluidization velocity, and compositions of gases present inside and outside a draft tube within the reaction zone are made to differ from each other by feeding a gas and/or liquid into the draft tube through a pipe.

20. The polyolefin production process according to claim 16, comprising the steps of:

continuously feeding olefin to the olefin polymerization reactor through the gas inlet orifice and the plurality of through holes and continuously removing a gas containing unreacted olefin from the olefin polymerization reactor and returning the removed gas to the olefin polymerization reactor; and cooling part or all of the removed gas so as to obtain an olefin-containing condensate.

21. The polyolefin production process according to claim 20, further comprising a step of feeding the condensate to a spout portion formed within the reaction zone.

22. A polyolefin production system, comprising:

an olefin pre-reactor for polymerizing olefin in the presence of an olefin polymerization catalyst and forming polyolefin particles; and the olefin polymerization reactor according to claim 1 or 2 connected as a subsequent stage to the olefin pre-reactor.

23. A polyolefin production process, comprising a step of carrying out multistage olefin polymerization by using the polyolefin production system of claim 22.

* * * * *